US012579946B2

(12) United States Patent
Kim et al.

(10) Patent No.: US 12,579,946 B2
(45) Date of Patent: Mar. 17, 2026

(54) GATE DRIVER AND DISPLAY DEVICE

(71) Applicant: Samsung Display Co., LTD., Yongin-si (KR)

(72) Inventors: Hyuk Kim, Yongin-si (KR); Boyong Chung, Yongin-si (KR); Tak Young Lee, Yongin-si (KR); Sang-Uk Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/058,582

(22) Filed: Feb. 20, 2025

(65) Prior Publication Data

US 2025/0349260 A1 Nov. 13, 2025

(30) Foreign Application Priority Data

May 9, 2024 (KR) ........................ 10-2024-0061283

(51) Int. Cl.
*G09G 3/3266* (2016.01)
*G09G 3/32* (2016.01)
*G09G 3/3233* (2016.01)

(52) U.S. Cl.
CPC ......... *G09G 3/3266* (2013.01); *G09G 3/3233* (2013.01); *G09G 3/32* (2013.01); *G09G 2300/0819* (2013.01); *G09G 2300/0842* (2013.01); *G09G 2310/0286* (2013.01)

(58) Field of Classification Search
CPC ......... G09G 2300/0842; G09G 3/3266; G09G 3/32; G09G 2310/0286; G09G 3/3233; G09G 2300/0819
See application file for complete search history.

(56) References Cited

U.S. PATENT DOCUMENTS

2020/0243018 A1* 7/2020 Kim ..................... G09G 3/3266
2020/0372851 A1* 11/2020 Kim ..................... G09G 3/2092
2021/0056910 A1* 2/2021 Chung ................. G09G 3/3225

FOREIGN PATENT DOCUMENTS

KR 10-2021-0089296 A 7/2021
KR 10-2022-0154316 A 11/2022

* cited by examiner

*Primary Examiner* — Muhammad N Edun
(74) *Attorney, Agent, or Firm* — Womble Bond Dickinson (US) LLP

(57) ABSTRACT

A stage of a gate driver includes a sensing input circuit a sensing input signal, a scan input circuit, a Q node separating circuit between a sensing Q node and a scan Q node, a QB node controlling circuit, a sensing carry circuit configured to output a sensing carry signal based on a voltage of the sensing Q node and a voltage of a shared QB node, a sensing output circuit configured to output a sensing signal based on the voltage of the sensing Q node and the voltage of the shared QB node, a scan carry circuit configured to output a scan carry signal based on a voltage of the scan Q node and the voltage of the shared QB node, and a scan output circuit configured to output a scan signal based on the voltage of the scan Q node and the voltage of the shared QB node.

20 Claims, 17 Drawing Sheets

TP1

TP2

GATE DRIVER AND DISPLAY DEVICE

CROSS-REFERENCE TO RELATED APPLICATION(S)

The present application claims priority to and the benefit of Korean Patent Application No. 10-2024-0061283, filed on May 9, 2024, in the Korean Intellectual Property Office, the entire disclosure of which is incorporated herein by reference.

BACKGROUND

1. Field

Aspects of some embodiments of the present disclosure relate to a gate driver and a display device.

2. Description of the Related Art

A display device may include a display panel that includes a plurality of pixels, a data driver that provides data signals to the plurality of pixels, a gate driver that provides gate signals to the plurality of pixels, and a controller that controls the data driver and the gate driver.

The gate driver may be implemented in the form of a shift register including a plurality of stages configured to sequentially provide the gate signals to the plurality of pixels on a row-by-row basis. Further, the gate driver may provide two or more gate signals (e.g., a scan signal and a sensing signal) to each pixel. In this case, the gate driver may include two or more shift registers.

The above information disclosed in this Background section is only for enhancement of understanding of the background and therefore the information discussed in this Background section does not necessarily constitute prior art.

SUMMARY

Aspects of some embodiments of the present disclosure relate to a display device, and for example, to a gate driver, and a display device including the gate driver.

Aspects of some embodiments of the present disclosure relate to a display device, and for example, to a gate driver, and a display device including the gate driver.

Aspects of some embodiments include a gate driver in which each stage outputs a scan signal and a sensing signal and having a small size.

Aspects of some embodiments include a display device including a gate driver in which each stage outputs a scan signal and a sensing signal and having a small size.

According to some embodiments, there is provided a gate driver including a plurality of stages. According to some embodiments, at least one stage of the plurality of stages includes a sensing input circuit configured to transfer a sensing input signal to a sensing Q node, a scan input circuit configured to transfer a scan input signal to a scan Q node, a Q node separating circuit between the sensing Q node and the scan Q node, and configured to prevent a voltage of the sensing Q node from being transferred to the scan Q node, a QB node controlling circuit configured to control a voltage of a shared QB node based on a high voltage, a first low voltage and the voltage of the sensing Q node, a sensing carry circuit configured to output a carry clock signal as a sensing carry signal in response to the voltage of the sensing Q node, and to output the first low voltage as the sensing carry signal in response to the voltage of the shared QB node, a sensing output circuit configured to output a sensing clock signal as a sensing signal in response to the voltage of the sensing Q node, and to output a second low voltage as the sensing signal in response to the voltage of the shared QB node, a scan carry circuit configured to output the carry clock signal as a scan carry signal in response to a voltage of the scan Q node, and to output the first low voltage as the scan carry signal in response to the voltage of the shared QB node, and a scan output circuit configured to output a scan clock signal as a scan signal in response to the voltage of the scan Q node, and to output the second low voltage as the scan signal in response to the voltage of the shared QB node.

According to some embodiments, an active scan period may be initiated in an active period of a frame period. According to some embodiments, in the active scan period, the plurality of stages may sequentially output the sensing signal having the high voltage and the scan signal having the high voltage. According to some embodiments, when a blank period of the frame period continues for a predetermined time, a self-scan period may be initiated in the blank period. According to some embodiments, in the self-scan period, the plurality of stages may sequentially output the sensing signal having the high voltage, and may not output the scan signal having the high voltage.

According to some embodiments, when a next frame period starts before the self-scan period ends, the self-scan period may overlap with an active scan period of the next frame period. According to some embodiments, in an overlapping period where the self-scan period and the active scan period of the next frame period overlap, a first portion of the plurality of stages may sequentially output the sensing signal having the high voltage and the scan signal having the high voltage, and a second portion of the plurality of stages may sequentially output the sensing signal having the high voltage and does not output the scan signal having the high voltage.

According to some embodiments, when the next frame period starts, the scan Q node of the at least one stage may be reset to the first low voltage in response to a start signal, and the sensing Q node of the at least one stage may not be reset.

According to some embodiments, the Q node separating circuit may include a first transistor which is diode-connected to prevent or reduce instances of the voltage of the sensing Q node being transferred to the scan Q node when the sensing Q node has the high voltage.

According to some embodiments, the first transistor may include a gate connected to the scan Q node, a first terminal connected to the sensing Q node, and a second terminal connected to the scan Q node.

According to some embodiments, the Q node separating circuit may include a first transistor configured to selectively connect the sensing Q node and the scan Q node to each other in response to a control signal, and the control signal may have an on-level in an active scan period, and has an off-level in a self-scan period.

According to some embodiments, the first transistor may include a gate which receives the control signal, a first terminal connected to the sensing Q node, and a second terminal connected to the scan Q node.

According to some embodiments, the sensing input circuit may include a second transistor including a gate which receives the sensing input signal, a first terminal which receives the sensing input signal, and a second terminal connected to the sensing Q node. According to some embodiments, the scan input circuit may include a third transistor including a gate which receives the scan input signal, a first terminal which receives the scan input signal, and a second terminal connected to the scan Q node.

According to some embodiments, the QB node controlling circuit may transfer the first low voltage to the shared QB node when the sensing Q node has the high voltage or the sensing input signal has the high voltage, and may transfer the high voltage to the shared QB node when the sensing Q node has the first low voltage.

According to some embodiments, the QB node controlling circuit may include a fourth transistor including a gate connected to the sensing Q node, a first terminal which receives the first low voltage, and a second terminal connected to the shared QB node, a fifth transistor including a gate which receives the sensing input signal, a first terminal which receives the first low voltage, and a second terminal connected to the shared QB node, a sixth transistor including a gate which receives the high voltage, a first terminal which receives the high voltage, and a second terminal, a seventh transistor including a gate connected to the sensing Q node, a first terminal, and a second terminal which receives the second low voltage, and an eighth transistor including a gate connected to the second terminal of the sixth transistor and the first terminal of the seventh transistor, a first terminal which receives the high voltage, and a second terminal connected to the shared QB node.

According to some embodiments, the sensing output circuit may include a ninth transistor including a gate connected to the sensing Q node, a first terminal which receives the sensing clock signal, and a second terminal connected to a sensing output node from which the sensing signal is output, a first capacitor including a first electrode connected to the sensing Q node, and a second electrode connected to the sensing output node, and a tenth transistor including a gate connected to the shared QB node, a first terminal connected to the sensing output node, and a second terminal which receives the second low voltage. According to some embodiments, the scan output circuit may include an eleventh transistor including a gate connected to the scan Q node, a first terminal which receives the scan clock signal, and a second terminal connected to an scan output node from which the scan signal is output, a second capacitor including a first electrode connected to the scan Q node, and a second electrode connected to the scan output node, and a twelfth transistor including a gate connected to the shared QB node, a first terminal connected to the scan output node, and a second terminal which receives the second low voltage.

According to some embodiments, the sensing carry circuit may include a thirteenth transistor including a gate connected to the sensing Q node, a first terminal which receives the carry clock signal, and a second terminal connected to a sensing carry node from which the sensing carry signal is output, and a fourteenth transistor including a gate connected to the shared QB node, a first terminal connected to the sensing carry node, and a second terminal which receives the first low voltage. According to some embodiments, the scan carry circuit may include a fifteenth transistor including a gate connected to the scan Q node, a first terminal which receives the carry clock signal, and a second terminal connected to a scan carry node from which the scan carry signal is output, and a sixteenth transistor including a gate connected to the shared QB node, a first terminal connected to the scan carry node, and a second terminal which receives the first low voltage.

According to some embodiments, the at least one stage may further include a sensing Q node discharging circuit configured to discharge the sensing Q node to the first low voltage in response to a sensing carry signal of a next stage or the voltage of the shared QB node, and a scan Q node discharging circuit configured to discharge the scan Q node to the first low voltage in response to the scan carry signal of the next stage.

According to some embodiments, the sensing Q node discharging circuit may include a seventeenth transistor including a gate which receives the sensing carry signal of the next stage, a first terminal connected to the sensing Q node, and a second terminal which receives the first low voltage, and an eighteenth transistor including a gate connected to the shared QB node, a first terminal connected to the sensing Q node, and a second terminal which receives the first low voltage. According to some embodiments, the scan Q node discharging circuit may include a nineteenth transistor including a gate which receives the scan carry signal of the next stage, a first terminal connected to the scan Q node, and a second terminal which receives the first low voltage.

According to some embodiments, the at least one stage may further include a sensing reset circuit configured to reset the sensing Q node to the first low voltage in response to a reset signal that has the high voltage when a self-scan period starts, and a scan reset circuit configured to reset the scan Q node to the first low voltage in response to a start signal that has the high voltage when an active scan period starts or when the self-scan period starts.

According to some embodiments, the sensing reset circuit may include a twentieth transistor including a gate which receives the reset signal, a first terminal connected to the sensing Q node, and a second terminal that receives the first low voltage. According to some embodiments, the scan reset circuit may include a twenty-first transistor including a gate which receives the start signal, a first terminal connected to the scan Q node, and a second terminal that receives the first low voltage.

According to some embodiments, at least one transistor included in the at least one stage may include a plurality of sub-transistors connected in series. According to some embodiments, the at least one stage may further include an intermediate node controlling circuit configured to transfer the high voltage to a node between the plurality of sub-transistors.

According to some embodiments, the intermediate node controlling circuit may include a twenty-second transistor including a gate connected to the sensing Q node, a first terminal which receives the high voltage, and a second terminal connected to the node between the plurality of sub-transistors.

According to some embodiments, a display device includes a display panel including a plurality of pixels, a data driver configured to provide data signals to the plurality of pixels, a gate driver configured to sequentially provide a sensing signal and a scan signal to the plurality of pixels, and a controller configured to control the data driver and the gate driver. According to some embodiments, the gate driver includes a plurality of stages, and at least one stage of the plurality of stages includes a sensing input circuit configured to transfer a sensing input signal to a sensing Q node, a scan input circuit configured to transfer a scan input signal to a scan Q node, a Q node separating circuit between the sensing Q node and the scan Q node, and configured to prevent or reduce instances of a voltage of the sensing Q node being transferred to the scan Q node, a QB node controlling circuit configured to control a voltage of a shared QB node based on a high voltage, a first low voltage and the voltage of the sensing Q node, a sensing carry circuit configured to output a carry clock signal as a sensing carry signal in response to the voltage of the sensing Q node, and to output the first low voltage as the sensing carry signal in response to the voltage of the shared QB node, a sensing output circuit configured to output a sensing clock signal as the sensing signal in response to the voltage of the sensing Q node, and to output a second low voltage as the sensing signal in response to the voltage of the shared QB node, a scan carry circuit configured to output the carry clock signal as a scan carry signal in response to a voltage of the scan Q node, and to output the first low voltage as the scan carry signal in response to the voltage of the shared QB node, and a scan output circuit configured to output a scan clock signal as the scan signal in response to the voltage of the scan Q node, and to output the second low voltage as the scan signal in response to the voltage of the shared QB node.

As described above, in a gate driver and a display device according to some embodiments, a single stage may output two gate signals, or a sensing signal and a scan signal. Further, the stage may output the sensing signal and the scan signal by using a single shared QB node and a single QB node controlling circuit. Accordingly, the gate driver may have a relatively small size, and a dead space area of the display device may be relatively reduced.

Further, in the gate driver and the display device according to some embodiments, a plurality of stages may sequentially output the sensing signal and the scan signal in an active scan period, and may sequentially output only the sensing signal in a self-scan period. In addition, in an overlapping period where the active scan period and the self-scan period overlap, a first portion of the plurality of stages may sequentially output the sensing signal and the scan signal, and at the same time, a second portion of the plurality of stages may sequentially output only the sensing signal. Accordingly, the gate driver according to some embodiments may be suitable for a display device that operates in a variable frame mode.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
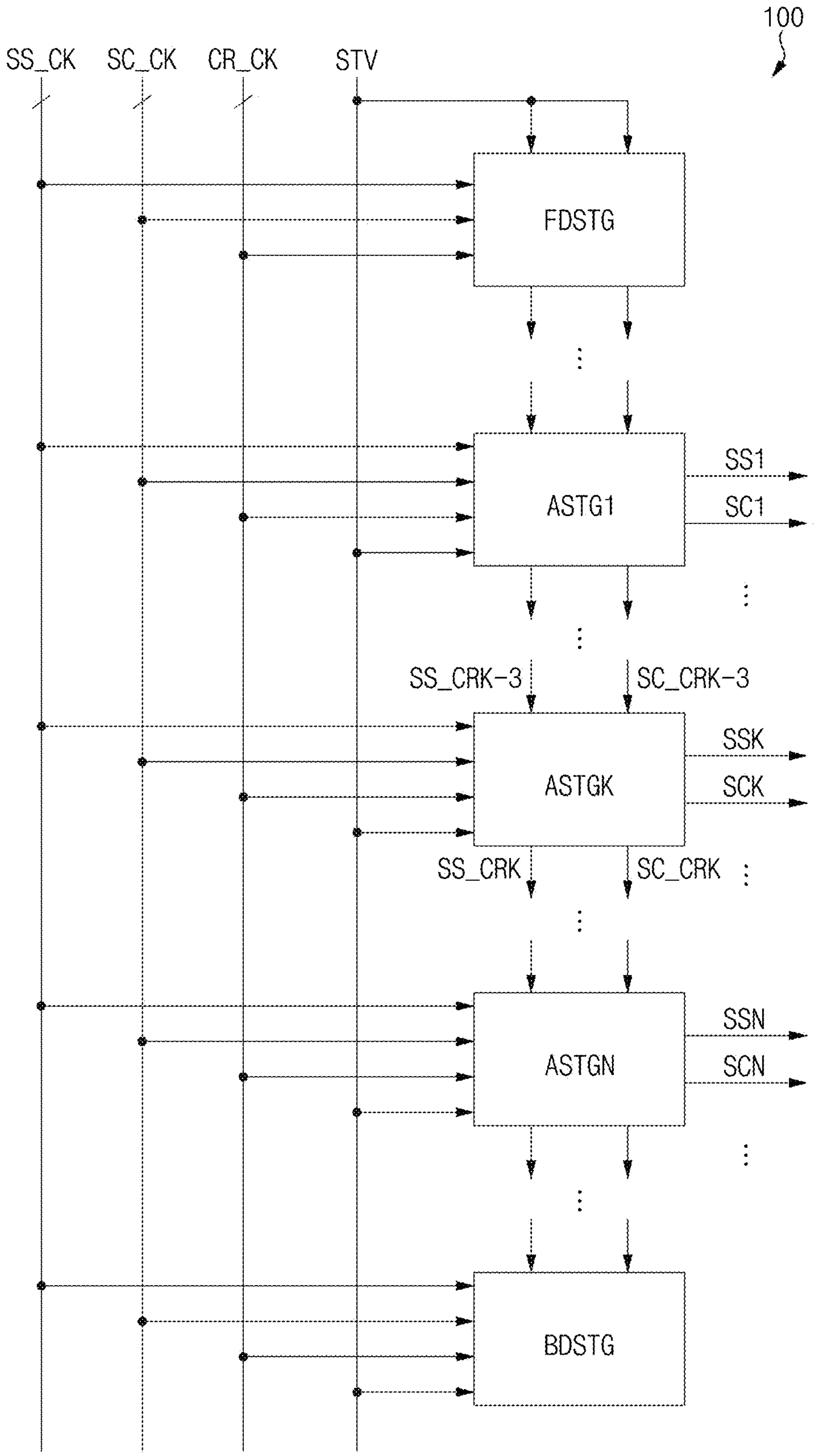
FIG. 1 is a block diagram illustrating a gate driver according to some embodiments.

The embodiments are described more fully hereinafter with reference to the accompanying drawings. Like or similar reference numerals refer to like or similar elements throughout.

Figure 2:
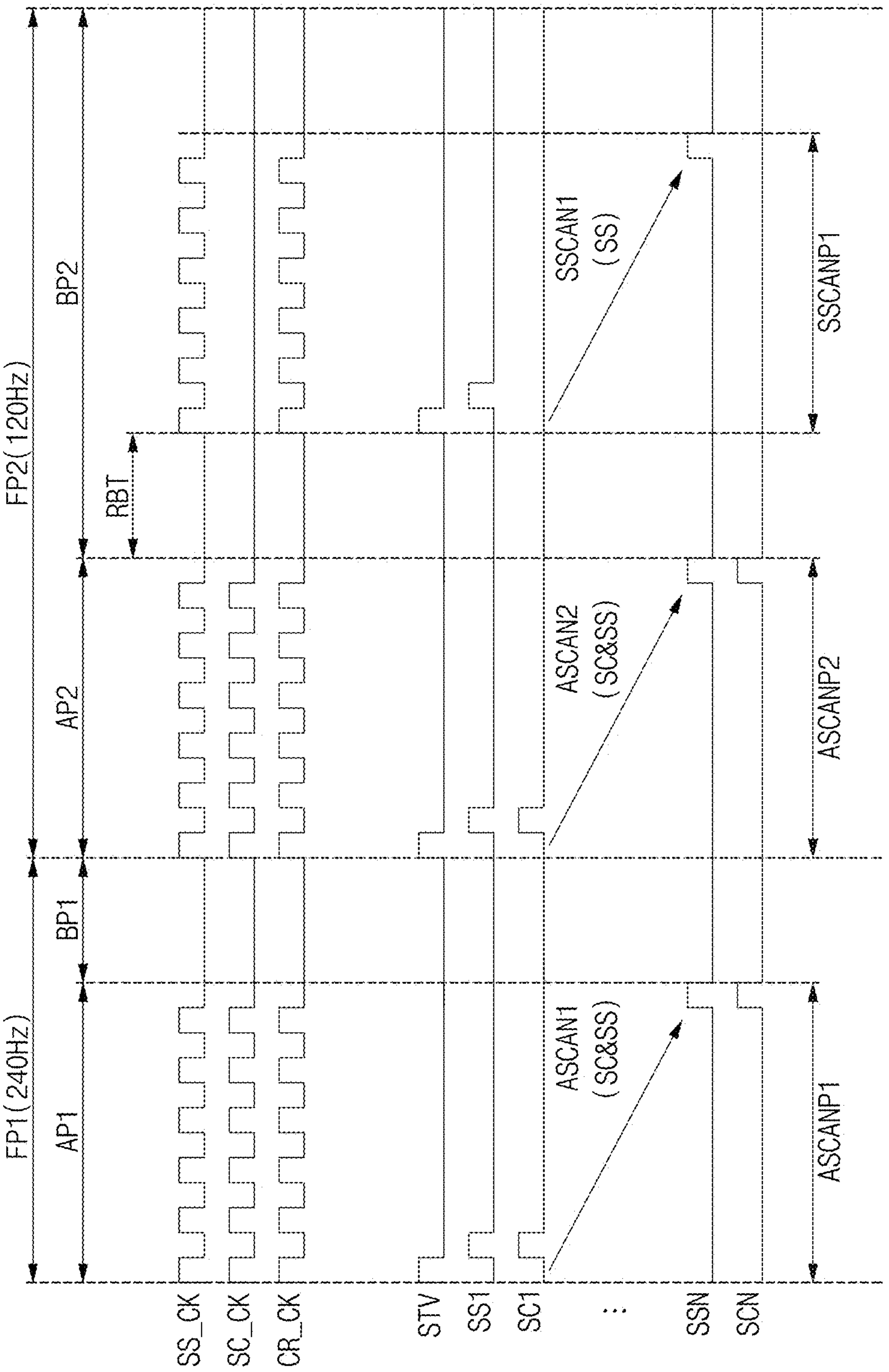
FIG. 2 is a timing diagram for describing an example of an operation of a gate driver of FIG. 1.
Figure 3:
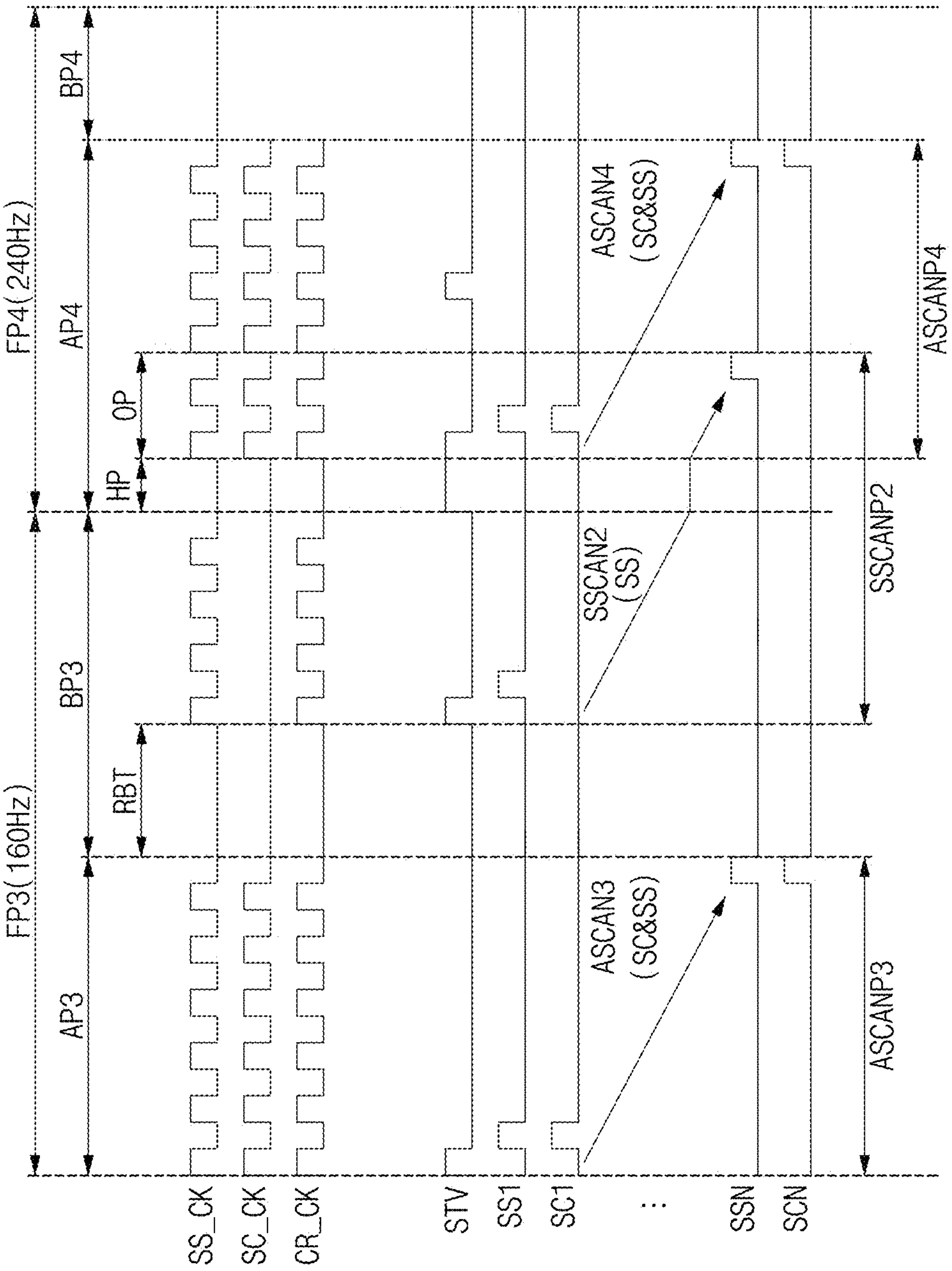
FIG. 3 is a timing diagram for describing another example of an operation of a gate driver of FIG. 1.

FIG. 1 is a block diagram illustrating a gate driver according to some embodiments, FIG. 2 is a timing diagram for describing an example of an operation of a gate driver of FIG. 1, and FIG. 3 is a timing diagram for describing another example of an operation of a gate driver of FIG. 1.

Referring to FIG. 1, a gate driver 100 according to some embodiments may include a plurality of stages FDSTG, . . . , ASTG1, . . . , ASTGK, . . . , ASTGN, . . . , and BDSTG. The gate driver 100 may be implemented in a form of a shift register, in which the plurality of stages FDSTG, . . . , ASTG1, . . . , ASTGK, . . . , ASTGN, . . . , and BDSTG sequentially outputs a sensing signal SS1, . . . , SSK, . . . , and SSN and/or a scan signal SC1, . . . , SCK, . . . , and SCN. According to some embodiments, the gate driver 100 may include, as the plurality of stages FDSTG, . . . , ASTG1, . . . , ASTGK, . . . , ASTGN, . . . , and BDSTG, at least one front dummy stage FDSTG, . . . , N active stages ASTG1, . . . , ASTGK, . . . , and ASTGN, and at least one back dummy stage . . . , BDSTG, where N is an integer greater than 1.

The plurality of stages FDSTG, . . . , ASTG1, . . . , ASTGK, . . . , ASTGN, . . . , and BDSTG may receive sensing clock signals SS_CK, scan clock signals SC_CK, carry clock signals CR_CK, and a start signal STV. For example, among the plurality of stages FDSTG, . . . , ASTG1, . . . , ASTGK, . . . , ASTGN, . . . , and BDSTG, six consecutive stages may receive, but are not limited to, six sensing clock signals SS_CK having different phases, six scan clock signals SC_CK having different phases, and six carry clock signals CR_CK having different phases. Further, the front dummy stage FDSTG may receive the start signal STV as a sensing input signal and a scan input signal, and each of the active stages ASTG1, . . . , ASTGK, . . . , and ASTGN and the back dummy stage BDSTG may receive a sensing carry signal of a previous stage as a sensing input signal and a scan carry signal of the previous stage as a scan input signal. For example, a K-th active stage ASTGK may receive a (K−3)-th sensing carry signal SS_CRK−3 of a (K−3)-th active stage as the sensing input signal, and may receive a (K−3)-th scan carry signal SC_CRK−3 of the (K−3)-th active stage as the scan input signal, where K is an integer from 1 to N. Further, in some embodiments, the active stages ASTG1, . . . , ASTGK, . . . , and ASTGN and the back dummy stage BDSTG may receive the start signal STV, and scan Q nodes of the active stages ASTG1, . . . , ASTGK, and ASTGN and the back dummy stage BDSTG may be substantially simultaneously reset (e.g., to a first low voltage) in response to the start signal STV.

Each stage FDSTG, . . . , ASTG1, . . . , ASTGK, . . . , ASTGN, . . . , and BDSTG may generate a corresponding sensing carry signal and a corresponding scan carry signal, and the first through N-th active stages ASTG1, . . . , ASTGK, . . . , and ASTGN may sequentially output first through N-th sensing signals SS1, . . . , SSK, . . . , and SSN and/or first through N-th scan signals SC1, . . . , SCK, . . . , and SCN. For example, the K-th active stage ASTGK may generate a K-th sensing carry signal SS_CRK and a K-th scan carry signal SC_CRK to be provided to another stage, and may output a K-th sensing signal SSK and/or a K-th scan signal SCK to a K-th pixel row of a display panel.

A display device including the gate driver 100 according to some embodiments may drive the display panel at a variable frequency (or a variable refresh rate). For example, the display device may drive the display panel at the variable frequency by changing a time length of a blank period. Further, an active scan period may be initiated in an active period of each frame period, and the gate driver 100 may sequentially output the sensing signal SS1, . . . , SSK, . . . , and SSN having a high voltage and the scan signal SC1, . . . , SCK, . . . , and SCN having the high voltage in the active scan period. In addition, when the blank period of each frame period continues for a time period (e.g., a set or predetermined time period) (e.g., a reference blank time) or longer, a self-scan period may be initiated within the blank period, and the gate driver 100 may perform a self-scan operation that sequentially outputs the sensing signal SS1, . . . , SSK, . . . , and SSN having the high voltage and that does not output the scan signal SC1, . . . , SCK, . . . , and SCN having the high voltage in the self-scan period.

For example, as illustrated in FIG. 2, a first frame period FP1 corresponding to a frequency of about 240 Hz may include a first active period AP1 and a first blank period BP1, and a second frame period FP2 corresponding to a frequency of about 120 Hz may include a second active period AP2 and a second blank period BP2 longer than the first blank period BP1. In the first active period AP1 or a first active scan period ASCANP1, the gate driver 100 may perform a first active scan operation ASCAN1 that sequentially outputs scan and sensing signals SC&SS having the high voltage on a row-by-row basis based on the sensing clock signals SS_CK, the scan clock signals SC_CK, the carry clock signals CR_CK and the start signal STV. If the second frame period FP2 starts before the first blank period BP1 becomes longer than or equal to the reference blank time RBT, the self-scan operation may not be performed in the first blank period BP1. Further, in the second active period AP2 or a second active scan period ASCANP2, the gate driver 100 may perform a second active scan operation ASCAN2 that sequentially outputs the scan and sensing signals SC&SS on the row-by-row basis. If the second blank period BP2 is longer than or equal to the reference blank time RBT, a first self-scan period SSCANP1 may be initiated within the second blank period BP2. In the first self-scan period SSCANP1, the gate driver 100 may perform a first self-scan operation SSCAN1 that sequentially outputs the sensing signal SS having the high voltage on the row-by-row basis based on the sensing clock signals SS_CK, the carry clock signals CR_CK and the start signal STV. Further, in the first self-scan period SSCANP1, the carry clock signals CR_CK may be maintained at the first low voltage, and the gate driver 100 may not output the scan signal SC having the high voltage. That is, the first through N-th scan signals SC1, . . . , SCK, . . . , and SCN of the first through N-th active stages ASTG1, . . . , ASTGK, . . . , and ASTGN may be maintained at a second low voltage.

Further, in the display device including the gate driver 100 according to some embodiments, if a next frame period starts before the self-scan period ends, the self-scan period may overlap with an active scan period of the next frame period. In an overlapping period where the self-scan period and the active scan period of the next frame period overlap, the gate driver 100 may substantially simultaneously perform a self-scan operation and an active scan operation.

For example, as illustrated in FIG. 3, in a third active period AP3 of a third frame period FP3 corresponding to a frequency of about 160 Hz, or a third active scan period ASCANP3, the gate driver 100 may perform a third active scan operation ASCAN3 that sequentially outputs the scan and sensing signals SC&SS on the row-by-row basis. When a third blank period BP3 of the third frame period FP3 is longer than or equal to the reference blank time RBT, a second self-scan period SSCANP2 may be initiated within the third blank period BP3. In the second self-scan period SSCANP2, the gate driver 100 may perform a second self-scan operation SSCAN2 that sequentially outputs the sensing signal SS on the row-by-row basis. If a fourth active period AP4 of a fourth frame period FP4 is initiated before the second self-scan period SSCANP2 ends, or before the second self-scan operation SSCAN2 is completed, the second self-scan period SSCANP2 and the fourth active scan period ASCANP4 may partially overlap with each other. In an overlapping period OP where the second self-scan period SSCANP2 and the fourth active scan period ASCANP4 partially overlap, a first portion of the active stages ASTG1, . . . , ASTGK, . . . , and ASTGN may perform a fourth active scan operation ASCAN4 that sequentially outputs the scan and sensing signals SC&SS having the high voltage on the row-by-row basis, and at substantially the same time, a second portion of the active stages ASTG1, . . . , ASTGK, . . . , and ASTGN may continue to perform the second self-scan operation SSCAN2 that sequentially outputs the sensing signal SS having the high voltage on the row-by-row basis. If a fourth blank period BP4 of the fourth frame period FP4 ends before the reference blank time RBT, the self-scan operation may not be performed in the fourth blank period BP4.

According to some embodiments, as illustrated in FIG. 3, when the next frame period, or the fourth frame period FP4 is initiated before the second self-scan operation SSCAN2 is completed, the second self-scan operation SSCAN2 may be suspended for a hold period (e.g., a set or predetermined hold period) HP. For example, the hold period HP may be required such that the second self-scan operation SSCAN2 and the fourth active scan operation ASCAN4 are substantially simultaneously performed in response to the same sense, scan and carry clock signals SS_CK, SC_CK and CR_CK. Further, during the hold period HP, the start signal STV may have the high voltage, the scan Q nodes of the active stages ASTG1, . . . , ASTGK, . . . , and ASTGN and the back dummy stage BDSTG may be substantially simultaneously reset to the first low voltage in response to the start signal STV having the high voltage. Meanwhile, in the hold period HP, sensing Q nodes of the active stages ASTG1, . . . , ASTGK, . . . , and ASTGN and the back dummy stage BDSTG may not be reset. Accordingly, although the sense, scan and carry clock signals SS_CK, SC_CK and CR_CK toggle periodically in the overlapping period OP, the second portion of the active stages ASTG1, . . . , ASTGK, . . . , and ASTGN performing the second self-scan operation SSCAN2 may sequentially output the sensing signal SS having the high voltage on the row-by-row basis, but may not output the scan signal SC having the high voltage.

As described above, in the gate driver 100 according to some embodiments, a single stage (e.g., the K-th active stage ASTGK) may output two gate signals, or the sensing signal (e.g., the K-th sensing signal SSK) and the scan signal (e.g., the K-th scan signal SCK). Accordingly, the gate driver 100 may have a small size, and a dead space area of the display device including the gate driver 100 may be reduced. Further, the gate driver 100 according to some embodiments may sequentially output the scan and sensing signals SC&SS in the active scan period, and may sequentially output only the sensing signal SS in the self-scan period. In addition, in the overlapping period OP where the active scan period (e.g., the fourth active scan period ASCANP4) and the self-scan period (the second self-scan period SSCANP2) overlap, the active scan operation (e.g., the fourth active scan operation ASCAN4) and the self-scan operation (e.g., the second self-scan operation SSCAN2) may be substantially simultaneously performed. Accordingly, the gate driver 100 according to some embodiments may be suitable for a display device that operates in a variable frame mode.

Figure 4:
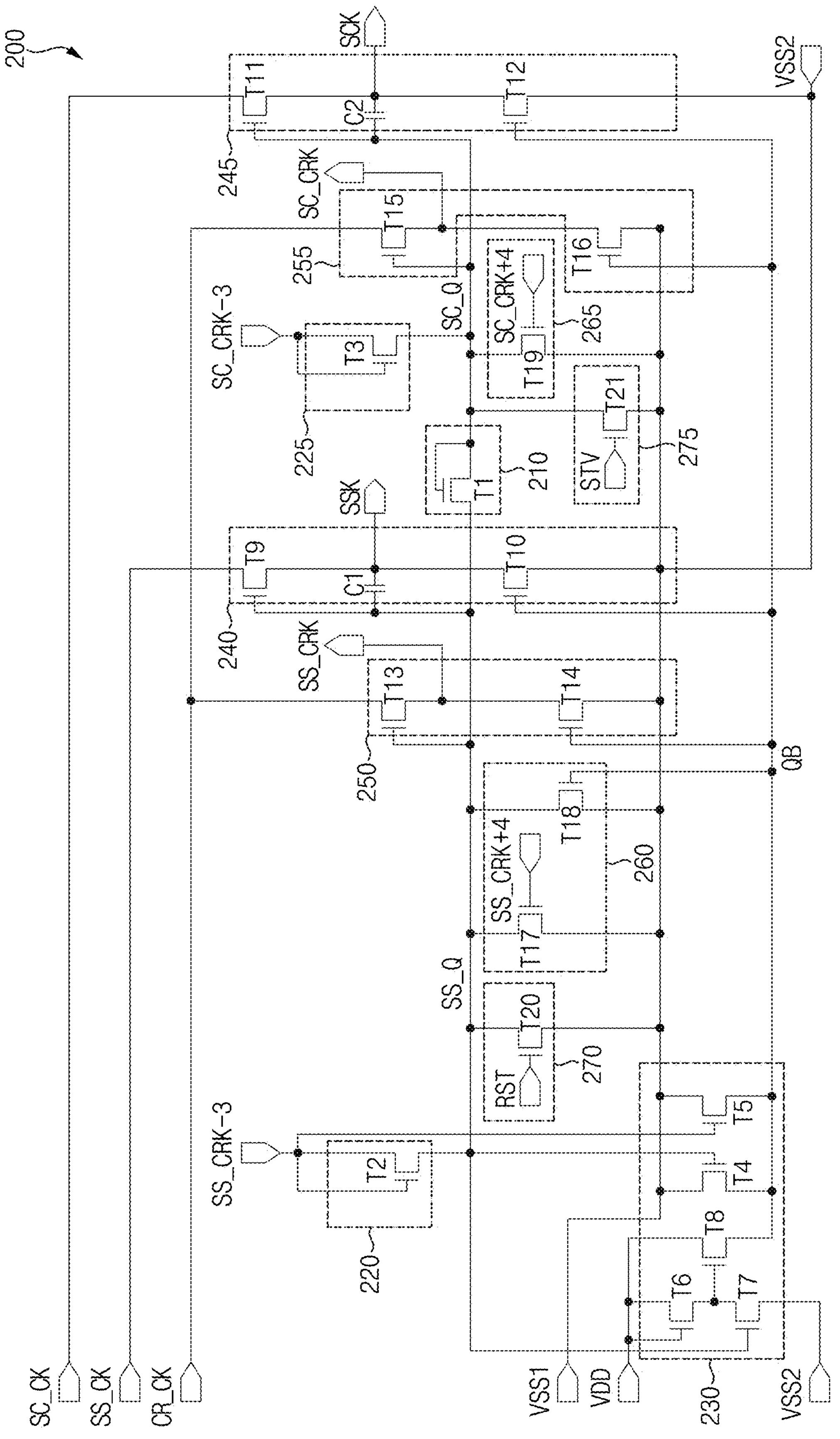
FIG. 4 is a circuit diagram illustrating a stage of a gate driver according to some embodiments.

FIG. 4 is a circuit diagram illustrating a stage of a gate driver according to some embodiments. Although FIG. 4 illustrates various components in a stage of a gate driver according to some embodiments, embodiments according to the present disclosure are not limited thereto, and according to various embodiments, the stage may include additional components or fewer components without departing from the spirit and scope of embodiments according to the present disclosure.

Referring to FIG. 4, a stage 200 (e.g., a K-th active stage ASTGK illustrated in FIG. 1) of a gate driver according to some embodiments may include a Q node separating circuit 210, a sensing input circuit 220, a scan input circuit 225, a QB node controlling circuit 230, a sensing output circuit 240, a scan output circuit 245, a sensing carry circuit 250 and a scan carry circuit 255. According to some embodiments, the stage 200 may further include a sensing Q node discharging circuit 260, a scan Q node discharging circuit 265, a sensing reset circuit 270 and a scan reset circuit 275.

The Q node separating circuit 210 may be located between a sensing Q node SS_Q for outputting a sensing signal SSK and a scan Q node SC_Q for outputting a scan signal SCK. The Q node separating circuit 210 may prevent or reduce instances of a voltage of the sensing Q node SS_Q being transferred to the scan Q node SC_Q when the sensing Q node SS_Q has a high voltage VDD. According to some embodiments, as illustrated in FIG. 4, the Q node separating circuit 210 may include a (diode-connected) first transistor T1. The diode-connected first transistor T1 may transfer the high voltage VDD of the scan Q node SC_Q to the sensing Q node SS_Q, but may prevent or reduce instances of the high voltage VDD of the sensing Q node SS_Q being transferred to the scan Q node SC_Q. Further, in some embodiments, the first transistor T1 may include a gate connected to the scan Q node SC_Q, a first terminal connected to the sensing Q node SS_Q, and a second terminal connected to the scan Q node SC_Q.

The sensing input circuit 220 may transfer a sensing input signal SS_CRK−3 to the sensing Q node SS_Q, and the scan input circuit 225 may transfer a scan input signal SC_CRK−3 to the scan Q node SC_Q. For example, in a case where the stage 200 is the K-th active stage ASTGK illustrated in FIG. 1, the sensing input signal SS_CRK−3 may be a (K−3)-th sensing carry signal SS_CRK−3 of a (K−3)-th active stage, and the scan input signal SC_CRK−3 may be a (K−3)-th scan carry signal SC_CRK−3 of the (K-3)-th active stage. According to some embodiments, the sensing input circuit 220 may include a second transistor T2 including a gate which receives the sensing input signal SS_CRK−3, a first terminal which receives the sensing input signal SS_CRK−3, and a second terminal connected to the sensing Q node SS_Q, and the scan input circuit 225 may include a gate which receives the scan input signal SC_CRK−3, a first terminal which receives the scan input signal SC_CRK−3, and a second terminal connected to the scan Q node SC_Q.

The QB node controlling circuit 230 may control a voltage of a shared QB node QB based on the high voltage VDD, a first low voltage VSS1 and the voltage of the sensing Q node SS_Q. The stage 200 of the gate driver according to some embodiments may have only the single shared QB node QB and the single QB node controlling circuit 230, and the sensing output circuit 240 for the sensing signal SSK and the scan output circuit 245 for the scan signal SCK may be commonly connected to the same shared QB node QB. Accordingly, compared with a stage having a QB node for the sensing signal SSK and another QB node for the scan signal SCK, the stage 200 may have a small size.

According to some embodiments, the QB node controlling circuit 230 may transfer the first low voltage VSS1 to the shared QB node QB when the sensing Q node SS_Q has the high voltage VDD or when the sensing input signal SS_CRK−3 has the high voltage VDD, and may transfer the high voltage VDD to the shared QB node QB when the sensing Q node SS_Q has the first low voltage VSS1. To perform these operations, in some embodiments, the QB node controlling circuit 230 may include a fourth transistor T4, a fifth transistor T5, a sixth transistor T6, a seventh transistor T7 and an eighth transistor T8. The fourth transistor T4 may include a gate connected to the sensing Q node SS_Q, a first terminal which receives the first low voltage VSS1, and a second terminal connected to the shared QB node QB. The fifth transistor T5 may include a gate which receives the sensing input signal SS_CRK−3, a first terminal which receives the first low voltage VSS1, and a second terminal connected to the shared QB node QB. The sixth transistor T6 may include a gate which receives the high voltage VDD, a first terminal which receives the high voltage VDD, and a second terminal. The seventh transistor T7 may include a gate connected to the sensing Q node SS_Q, a first terminal, and a second terminal which receives a second low voltage VSS2. The eighth transistor T8 may include a gate connected to the second terminal of the sixth transistor T6 and the first terminal of the seventh transistor T7, a first terminal which receives the high voltage VDD, and a second terminal connected to the shared QB node QB.

The sensing output circuit 240 may output the sensing signal SSK based on the voltage of the sensing Q node SS_Q and the voltage of the shared QB node QB, and the scan output circuit 245 may output the scan signal SCK based on a voltage of the scan Q node SC_Q and the voltage of the shared QB node QB. According to some embodiments, the sensing output circuit 240 may output a sensing clock signal SS_CK as the sensing signal SSK in response to the voltage of the sensing Q node SS_Q, and may output the second low voltage VSS2 as the sensing signal SSK in response to the voltage of the shared QB node QB. Further, the scan output circuit 245 may output a scan clock signal SC_CK as the scan signal SCK in response to the voltage of the scan Q node SC_Q, and may output the second low voltage VSS2 as the scan signal SCK in response to the voltage of the shared QB node QB. According to some embodiments, the second low voltage VSS2 may be higher than the first low voltage VSS1. That is, the first low voltage VSS1 may be lower than the second low voltage VSS2 such that that the stage 200 may operate stably.

According to some embodiments, to output the sensing signal SSK, the sensing output circuit 240 may include a ninth transistor T9 including a gate connected to the sensing Q node SS_Q, a first terminal which receives the sensing clock signal SS_CK, and a second terminal connected to a sensing output node from which the sensing signal SSK is output, and a tenth transistor T10 including a gate connected to the shared QB node QB, a first terminal connected to the sensing output node, and a second terminal which receives the second low voltage VSS2. According to some embodiments, the sensing output circuit 240 may further include a first capacitor C1 to boost the voltage of the sensing Q node SS_Q when outputting the sensing signal SSK having the high voltage VDD. The first capacitor C1 may be referred to as a first boosting capacitor or a first bootstrapping capacitor. For example, the first capacitor C1 may include a first electrode connected to the sensing Q node SS_Q, and a second electrode connected to the sensing output node.

Further, to output the scan signal SCK, the scan output circuit 245 may include an eleventh transistor T11 including a gate connected to the scan Q node SC_Q, a first terminal which receives the scan clock signal SC_CK, and a second terminal connected to a scan output node from which the scan signal SCK is output, and a twelfth transistor T12 including a gate connected to the shared QB node QB, a first terminal connected to the scan output node, and a second terminal which receives the second low voltage VSS2. According to some embodiments, the scan output circuit 245 may further include a second capacitor C2 to boost the voltage of the scan Q node SC_Q when outputting the scan signal SCK having the high voltage VDD. The second capacitor C2 may be referred to as a second boosting capacitor or a second bootstrapping capacitor. For example, the second capacitor C2 may include a first electrode connected to the scan Q node SC_Q, and a second electrode connected to the scan output node.

The sensing carry circuit 250 may output a sensing carry signal SS_CRK based on the voltage of the sensing Q node SS_Q and the voltage of the shared QB node QB, and the scan carry circuit 255 may output a scan carry signal SC_CRK based on the voltage of the scan Q node SC_Q and the voltage of the shared QB node QB. According to some embodiments, the sensing carry circuit 250 may output a carry clock signal CR_CK as the sensing carry signal SS_CRK in response to the voltage of the sensing Q node SS_Q, and may output the first low voltage VSS1 as the sensing carry signal SS_CRK in response to the voltage of the shared QB node QB. Further, the scan carry circuit 255 may output the carry clock signal CR_CK as the scan carry signal SC_CRK in response to the voltage of the scan Q node SC_Q, and may output the first low voltage VSS1 as the scan carry signal SC_CRK in response to the voltage of the shared QB node QB.

According to some embodiments, to output the sensing carry signal SS_CRK, the sensing carry circuit 250 may include a thirteenth transistor T13 including a gate connected to the sensing Q node SS_Q, a first terminal which receives the carry clock signal CR_CK, and a second terminal connected to a sensing carry node from which the sensing carry signal SS_CRK is output, and a fourteenth transistor T14 including a gate connected to the shared QB node QB, a first terminal connected to the sensing carry node, and a second terminal which receives the first low voltage VSS1. Further, to output the scan carry signal SC_CRK, the scan carry circuit 255 may include a fifteenth transistor T15 including a gate connected to the scan Q node SC_Q, a first terminal which receives the carry clock signal CR_CK, and a second terminal connected to a scan carry node from which the scan carry signal SC_CRK is output, and a sixteenth transistor T16 including a gate connected to the shared QB node QB, a first terminal connected to the scan carry node, and a second terminal which receives the first low voltage VSS1.

The sensing Q node discharging circuit 260 may discharge the sensing Q node SS_Q to the first low voltage VSS1 in response to a sensing carry signal SS_CRK+4 of a next stage (e.g., a (K+4)-th stage) or the voltage of the shared QB node QB, and the scan Q node discharging circuit 265 may discharge the scan Q node SC_Q to the first low voltage VSS1 in response to the scan carry signal SS_CRK+4 of the next stage. According to some embodiments, the sensing Q node discharging circuit 260 may include a seventeenth transistor T17 including a gate which receives the sensing carry signal SS_CRK+4 of the next stage, a first terminal connected to the sensing Q node SS_Q, and a second terminal which receives the first low voltage VSS1, and an eighteenth transistor T18 including a gate connected to the shared QB node QB, a first terminal connected to the sensing Q node SS_Q, and a second terminal which receives the first low voltage VSS1. Further, the scan Q node discharging circuit 265 may include a nineteenth transistor T19 including a gate which receives the scan carry signal SS_CRK+4 of the next stage, a first terminal connected to the scan Q node SC_Q, and a second terminal which receives the first low voltage VSS1.

The sensing reset circuit 270 may reset or discharge the sensing Q node SS_Q to the first low voltage VSS1 in response to a reset signal RST, and the scan reset circuit 275 may reset or discharge the scan Q node SC_Q to the first low voltage VSS1 in response to the start signal STV. According to some embodiments, the reset signal RST may be substantially simultaneously provided to a plurality of stages (e.g., active stages ASTG1, . . . , ASTGK, . . . , and ASTGN and a back dummy stage BDSTG illustrated in FIG. 1), and may have the high voltage VDD when a self-scan period starts. Thus, the sensing Q nodes SS_Q of the plurality of stages may be substantially simultaneously reset to the first low voltage VSS1 at the start of the self-scan period. In other embodiments, the reset signal RST may have the high voltage VDD when the active scan period ends. Further, in some embodiments, the start signal STV may be substantially simultaneously provided to the plurality of stages (e.g., the active stages ASTG1, . . . , ASTGK, . . . , and ASTGN and the back dummy stage BDSTG illustrated in FIG. 1), and may have the high voltage VDD when an active scan period starts or when the self-scan period starts. Accordingly, the scan Q nodes SC_Q of the plurality of stages may be substantially simultaneously reset to the first low voltage VSS1 at the start of the active scan period and at the start of the self-scan period.

Further, in some embodiments, the sensing reset circuit 270 may include a twentieth transistor T20 including a gate which receives the reset signal RST, a first terminal connected to the sensing Q node SS_Q, and a second terminal which receives the first low voltage VSS1, and the scan reset circuit 275 may include a twenty-first transistor T21 including a gate which receives the start signal STV, a first terminal connected to the scan Q node SC_Q, and a second terminal which receives the first low voltage VSS1.

According to some embodiments, as illustrated in FIG. 4, the first through twenty-first transistors T1 through T21 included in the stage 200 may be, but are not limited to, N-type metal-oxide-semiconductor ("NMOS") transistors. Further, the first through twenty-first transistors T1 through T21 may be, but are not limited to, oxide transistors having an oxide active region. In other embodiments, at least a portion of the first through twenty-first transistors T1 through T21 may be P-type metal-oxide-semiconductor ("PMOS") transistors.

Hereinafter, an example of an operation of the stage 200 in the active scan period will be described below with reference to FIGS. 4 through 6.

Figure 5:
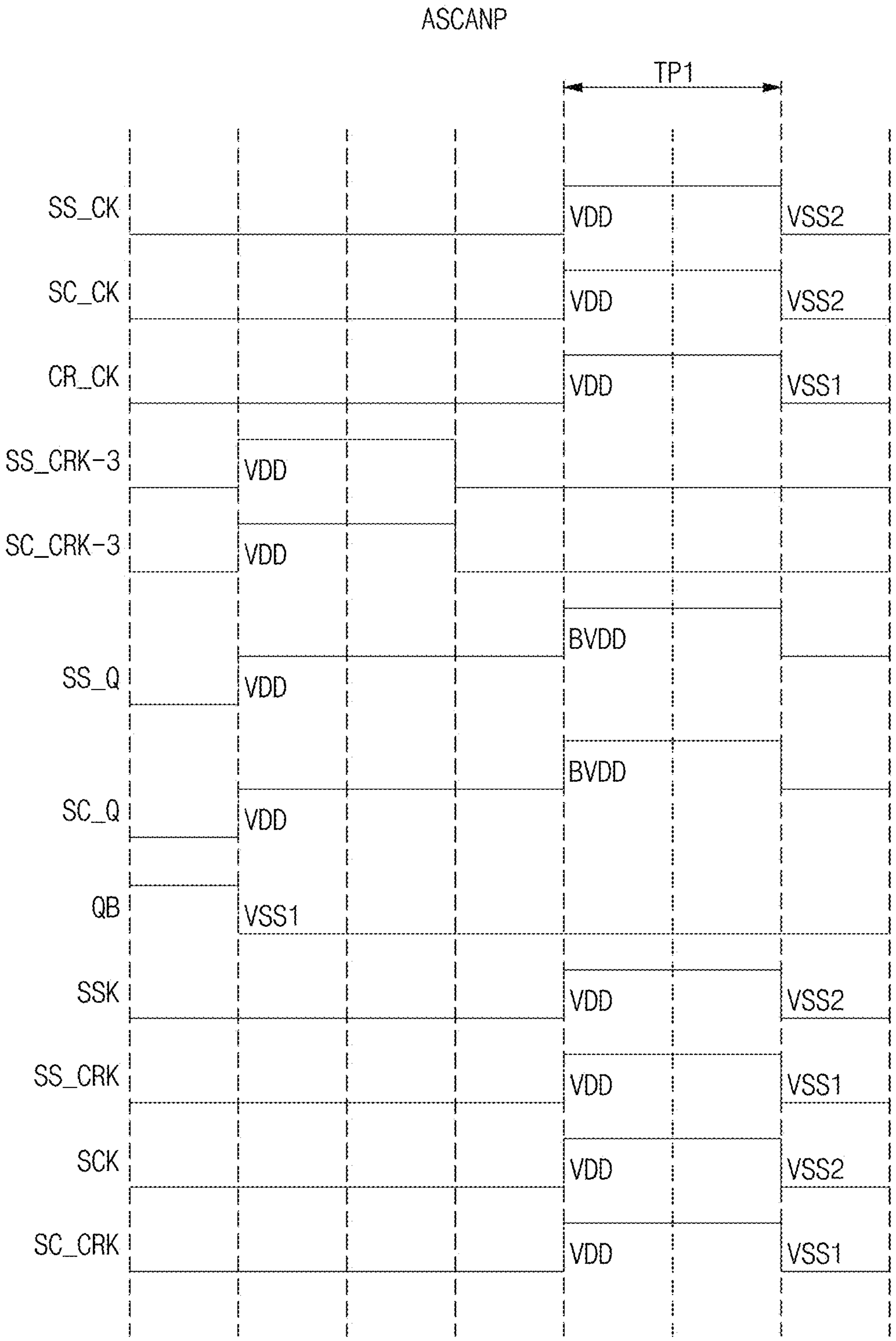
FIG. 5 is a timing diagram for describing an example of an operation of a stage of FIG. 4 in an active scan period.
Figure 6:
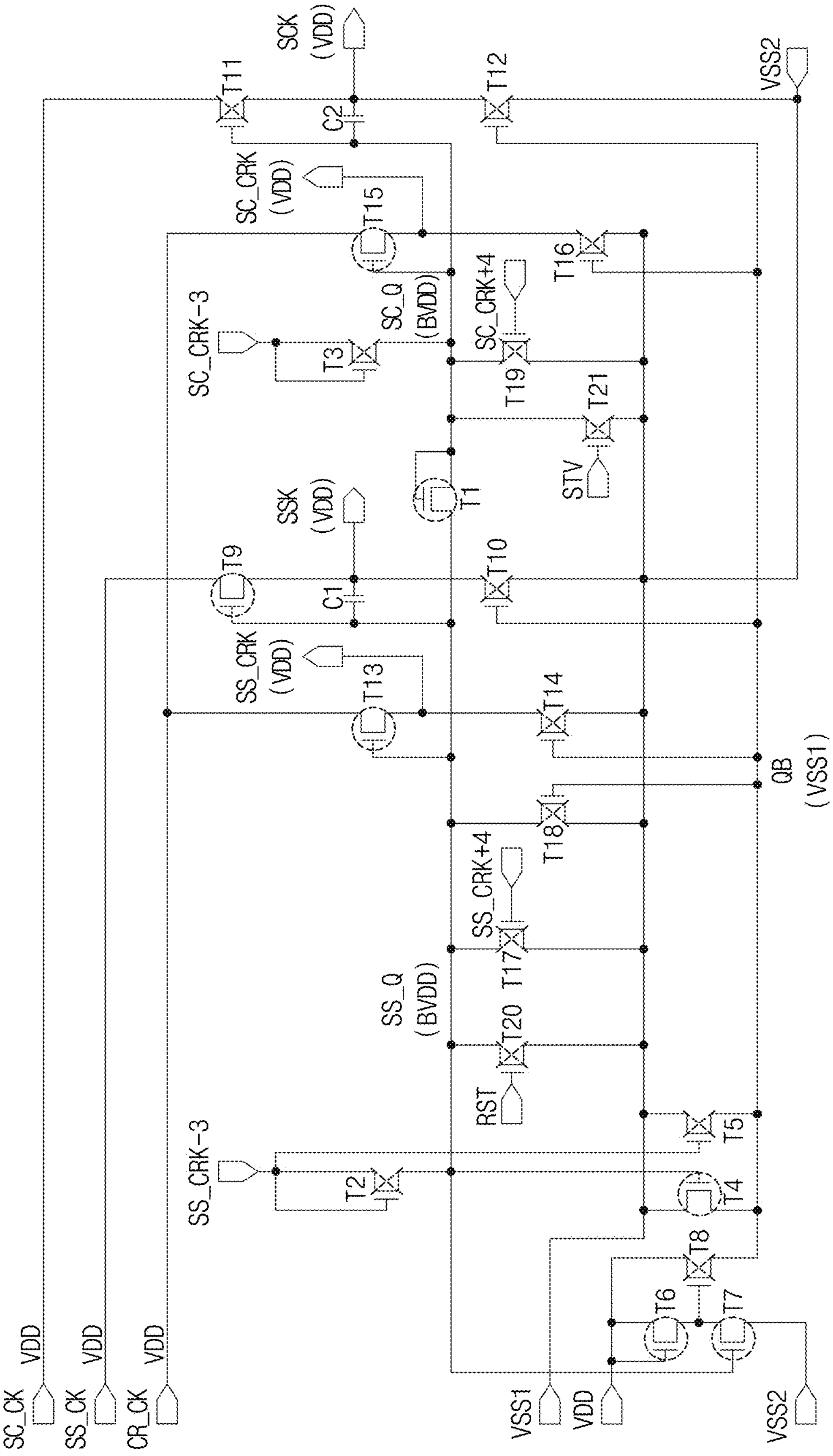
FIG. 6 is a circuit diagram for describing an example of an operation of a stage of FIG. 4 in a first time period.

FIG. 5 is a timing diagram for describing an example of an operation of a stage of FIG. 4 in an active scan period, and FIG. 6 is a circuit diagram for describing an example of an operation of a stage of FIG. 4 in a first time period.

Referring to FIGS. 4 and 5, in the active scan period ASCANP, the stage 200 (e.g., the K-th active stage ASTGK illustrated in FIG. 1) may receive the sensing input signal SS_CRK−3 (e.g., the (K−3)-th sensing carry signal SS_CRK−3) having a high voltage VDD and the scan input signal SC_CRK−3 (e.g., the (K−3)-th scan carry signal SC_CRK−3) having the high voltage VDD. The sensing input circuit 220 may transfer the sensing input signal SS_CRK−3 having the high voltage VDD to the sensing Q node SS_Q, and the scan input circuit 225 may transfer the scan input signal SC_CRK−3 having the high voltage VDD to the scan Q node SC_Q. Thus, the voltage of the sensing Q node SS_Q and the voltage of the scan Q node SC_Q may be changed to the high voltage VDD. Further, the QB node controlling circuit 230 may transfer the first low voltage VSS1 to the shared QB node QB in response to the sensing Q node SS_Q having the high voltage VDD and/or the sensing input signal SS_CRK−3 having the high voltage VDD. Thus, the voltage of the shared QB node QB may be changed to the first low voltage VSS1.

In a first time period TP1 in which the sensing clock signal SS_CK, the scan clock signal SC_CK and the carry clock signal CR_CK have the high voltage VDD while the sensing Q node SS_Q and the scan Q node SC_Q have the high voltage VDD, the stage 200 may generate the sensing carry signal SS_CRK having high voltage VDD and the scan carry signal SC_CRK having high voltage VDD, and may output the sensing signal SSK having high voltage VDD and the scan signal SCK having high voltage VDD to the K-th pixel row.

For example, as illustrated in FIG. 6, the ninth transistor T9 may be turned on in response to the high voltage VDD of the sensing Q node SS_Q, and may transfer the sensing clock signal SS_CK to the sensing output node from which the sensing signal SSK is output. When the sensing clock signal SS_CK at the sensing output node increases from the second low voltage VSS2 to the high voltage VDD, the high voltage VDD of the sensing Q node SS_Q may be boosted by the first capacitor C1. That is, the sensing Q node SS_Q may have a boosted high voltage BVDD. Thus, the ninth transistor T9 may be fully or completely turned on in response to the boosted high voltage BVDD of the sensing Q node SS_Q, and may output the high voltage VDD as the sensing signal SSK to the K-th pixel row. Further, the thirteenth transistor T13 may be fully or completely turned on in response to the boosted high voltage BVDD of the sensing Q node SS_Q. Thus, the thirteenth transistor T13 may output the carry clock signal CR_CK having the high voltage VDD as the sensing carry signal SS_CRK. The sensing carry signal SS_CRK of the stage 200 (e.g., the K-th active stage ASTGK illustrated in FIG. 1) may be provided to a (K+3)-th active stage and/or a (K−4)-th active stage, but is not limited thereto.

Further, the eleventh transistor T11 may be turned on in response to the high voltage VDD of the scan Q node SC_Q, and may transfer the scan clock signal SC_CK to the scan output node from which the scan signal SCK is output. When the scan clock signal SC_CK at the scan output node increases from the second low voltage VSS2 to the high voltage VDD, the high voltage VDD of the scan Q node SC_Q may be boosted by the second capacitor C2. That is, the scan Q node SC_Q may have the boosted high voltage BVDD. Thus, the eleventh transistor T11 can be fully or completely turned on in response to the boosted high voltage BVDD of the scan Q node SC_Q, and may output the high voltage VDD as the scan signal SCK to the K-th pixel row. Meanwhile, the first transistor T1 may be turned on in response to the boosted high voltage BVDD of the scan Q node SC_Q as illustrated in FIG. 6, but is not limited thereto. Alternatively, for example, when the sensing Q node SS_Q and the scan Q node SC_Q have substantially the same boosted high voltage BVDD and the first transistor T1 has a positive threshold voltage, the first transistor T1 may be turned off. Further, the fifteenth transistor T15 may be fully or completely turned on in response to the boosted high voltage BVDD of the scan Q node SC_Q. Thus, the fifteenth transistor T15 may output the carry clock signal CR_CK having the high voltage VDD as the scan carry signal SC_CRK. The scan carry signal SC_CRK of the stage 200 (e.g., the K-th active stage ASTGK illustrated in FIG. 1) may be provided to the (K+3)-th active stage and/or the (K−4)-th active stage, but is not limited thereto.

Further, in the first time period TP1, the fourth transistor T4 may be turned on in response to the boosted high voltage BVDD of the scan Q node SC_Q, and may transfer the first low voltage VSS1 to the shared QB node QB. Meanwhile, the sixth transistor T6 may be turned on in response to the high voltage VDD, but the seventh transistor T7 having a larger size (or greater driving capability) than the sixth transistor T6 may be turned on in response to the boosted high voltage BVDD of the scan Q node SC_Q. Thus, a node between the sixth transistor T6 and the seventh transistor T7 may have a voltage lower than a threshold voltage of the eighth transistor T8.

Accordingly, the eighth transistor T8 may be turned off. Further, in the first time period TP1, the fifth transistor T5, the tenth transistor T10, the twelfth transistor T12, the fourteenth transistor T14, the sixteenth transistor T16, the eighteenth transistor T18, the nineteenth transistor T19, the twentieth transistor T20 and the twenty-first transistor T21 may be turned off.

Thereafter, when the sensing clock signal SS_CK and the scan clock signal SC_CK are changed to the second low voltage VSS2, and the carry clock signal CR_CK is changed to the first low voltage VSS1, the stage 200 may output the sensing signal SSK having the second low voltage VSS2, the sensing carry signal SS_CRK having the first low voltage VSS1, the scan signal SCK having the second low voltage VSS2, and the scan carry signal SC_CRK having the first low voltage VSS1.

As described above, in the active scan period ASCANP, the stage 200 may output the sensing signal SSK having the high voltage VDD and the scan signal SCK having the high voltage VDD.

Hereinafter, an example of an operation of the stage 200 in the self-scan period will be described below with reference to FIG. 4, FIG. 7 and FIG. 8.

Figure 7:
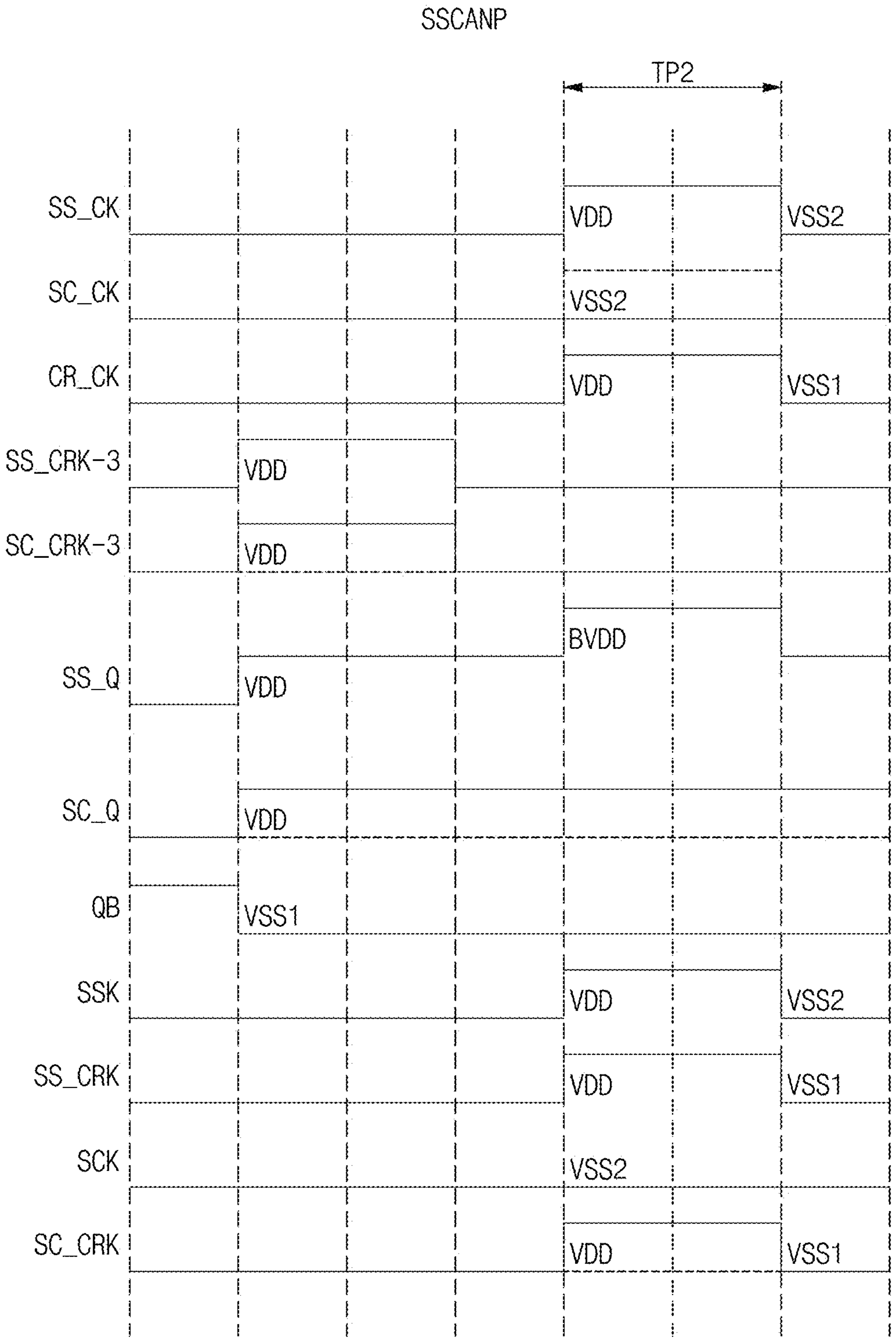
FIG. 7 is a timing diagram for describing an example of an operation of a stage of FIG. 4 in a self-scan period.
Figure 8:
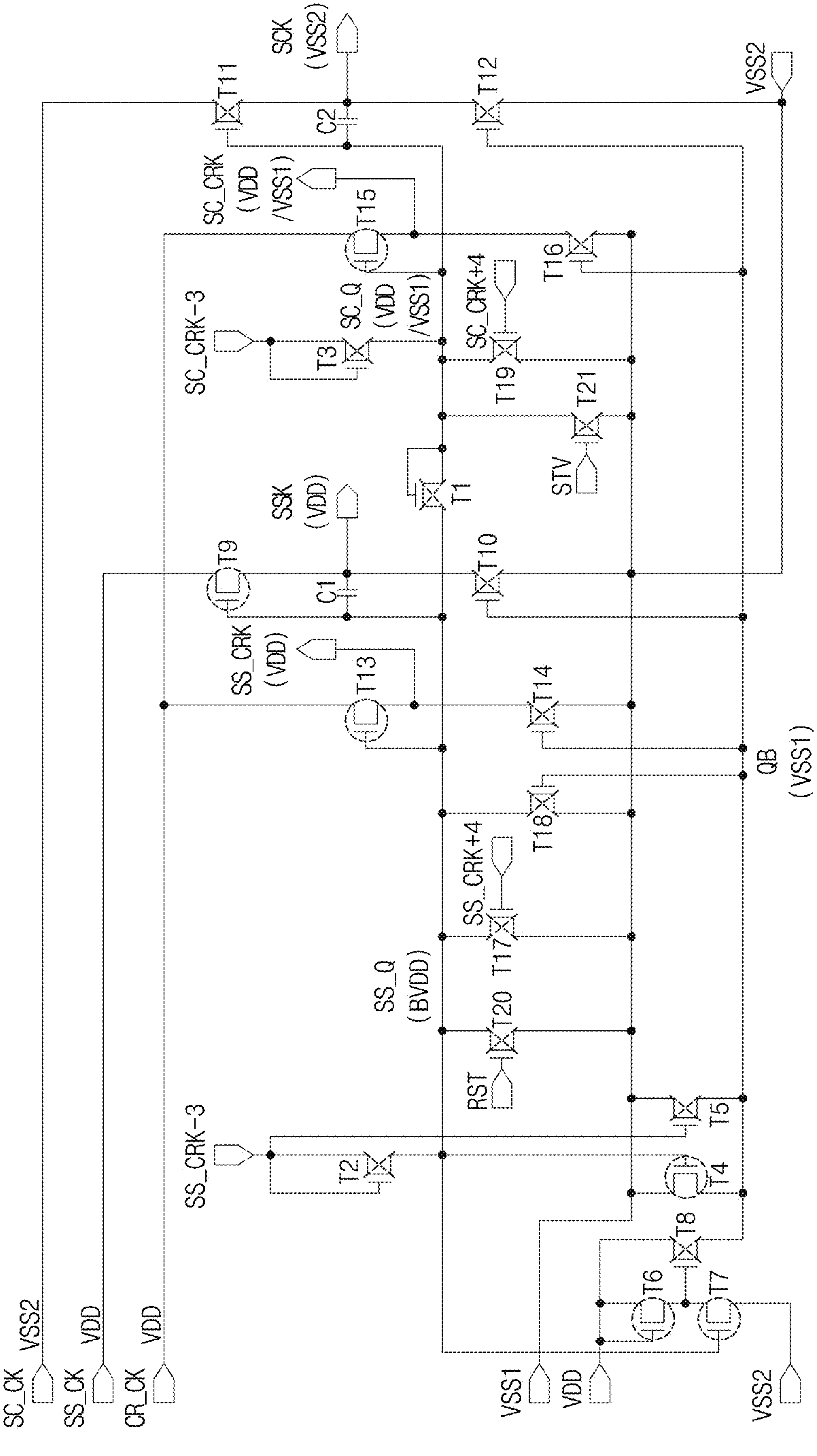
FIG. 8 is a circuit diagram for describing an example of an operation of a stage of FIG. 4 in a second time period.

FIG. 7 is a timing diagram for describing an example of an operation of a stage of FIG. 4 in a self-scan period, and FIG. 8 is a circuit diagram for describing an example of an operation of a stage of FIG. 4 in a second time period.

Referring to FIG. 4 and FIG. 7, in the self-scan period SSCANP, the stage 200 (e.g., the K-th active stage ASTGK illustrated in FIG. 1) may receive the sensing input signal SS_CRK−3 (e.g., the (K−3)-th sensing carry signal SS_CRK−3) having the high voltage VDD. Further, in the active scan period ASCANP, the stage 200 may receive the scan input signal SC_CRK−3 (e.g., the (K−3)-th scan carry signal SC_CRK−3) having the high voltage VDD or the first low voltage VSS1. For example, in a case where the self-scan period SSCANP is a first self-scan period SSCANP1 illustrated in FIG. 2, or in a case where the self-scan period SSCANP does not overlap with the active scan period, the stage 200 may receive the scan input signal SC_CRK−3 having the high voltage VDD. Alternatively, in a case where the scan Q nodes SC_Q of the plurality of stages are reset in response to the start signal STV in the hold period HP illustrated in FIG. 3, or in a case where the stage 200 receives the scan input signal SC_CRK−3 in the overlapping period OP illustrated in FIG. 3, the stage 200 may receive the scan input signal SC_CRK−3 having the first low voltage VSS1. The sensing input circuit 220 may transfer the sensing input signal SS_CRK−3 having the high voltage VDD to the sensing Q node SS_Q, and the scan input circuit 225 may transfer the scan input signal SC_CRK−3 having the high voltage VDD or the first low voltage VSS1 to the scan Q node SC_Q. Thus, the voltage of the sensing Q node SS_Q may be changed to the high voltage VDD, and the voltage of the scan Q node SC_Q may be changed to the high voltage VDD or the first low voltage VSS1. Further, the QB node controlling circuit 230 may transfer the first low voltage VSS1 to the shared QB node QB in response to the sensing Q node SS_Q having the high voltage VDD and/or the sensing input signal SS_CRK−3 having the high voltage VDD. Thus, the voltage of the shared QB node QB may be changed to the first low voltage VSS1.

In a second time period TP2 in which the sensing clock signal SS_CK and the carry clock signal CR_CK have the high voltage VDD while the sensing Q node SS_Q has the high voltage VDD, the stage 200 may generate the sensing carry signal SS_CRK having the high voltage VDD, and may output the sensing signal SSK having the high voltage VDD to the K-th pixel row. Further, in a case where the self-scan period SSCANP does not overlap with the active scan period, the scan Q node SC_Q may have the high voltage VDD, the scan clock signal SC_CK may be maintained at the second low voltage VSS2, the stage 200 may generate the scan carry signal SC_CRK having the high voltage VDD, and the sensing signal SSK may be maintained at the second low voltage VSS2. Alternatively, in a case where the second time period TP2 is within the overlapping period OP illustrated in FIG. 3, the scan Q node SC_Q may have the first low voltage VSS1, the scan clock signal SC_CK may have the high voltage VDD, the scan carry signal SC_CRK may be maintained at the first low voltage VSS1, and the sensing signal SSK may be maintained at the second low voltage VSS2.

For example, as illustrated in FIG. 8, the ninth transistor T9 may be turned on in response to the high voltage VDD of the sensing Q node SS_Q, and may transfer the sensing clock signal SS_CK to the sensing output node from which the sensing signal SSK is output. When the sensing clock signal SS_CK at the sensing output node increases from the second low voltage VSS2 to the high voltage VDD, the high voltage VDD of the sensing Q node SS_Q may be boosted by the first capacitor C1. That is, the sensing Q node SS_Q may have the boosted high voltage BVDD. Thus, the ninth transistor T9 may be fully or completely turned on in response to the boosted high voltage BVDD of the sensing Q node SS_Q, and may output the high voltage VDD as the sensing signal SSK to the K-th pixel row. Further, the thirteenth transistor T13 may be fully or completely turned on in response to the boosted high voltage BVDD of the sensing Q node SS_Q. Thus, the thirteenth transistor T13 may output the carry clock signal CR_CK having the high voltage VDD as the sensing carry signal SS_CRK.

In a case where the self-scan period SSCANP does not overlap with the active scan period, the voltage of the scan Q node SC_Q may have the high voltage VDD, and the eleventh transistor T11 may be turned on in response to the high voltage VDD of the scan Q node SC_Q. However, since the scan clock signal SC_CK has the second low voltage VSS2, although the eleventh transistor T11 is turned on, the sensing signal SSK may be maintained at the second low voltage VSS2. Further, the fifteenth transistor T15 may be turned on in response to the high voltage VDD of the scan Q node SC_Q, and may output the carry clock signal CR_CK having the high voltage VDD as the scan carry signal SC_CRK. Meanwhile, since the high voltage VDD of the scan Q node SC_Q is not boosted, the fifteenth transistor T15 may not be fully turned on. However, since the scan carry signal SC_CRK is not output to an external pixel, the scan carry signal SC_CRK may be increased to the high voltage VDD (or a voltage close to the high voltage VDD).

Alternatively, in a case where the second time period TP2 is within the overlapping period OP illustrated in FIG. 3, the voltage of the scan Q node SC_Q may have the first low voltage VSS1, and the eleventh transistor T11 and the fifteenth transistor T15 may be turned off in response to the first low voltage VSS1 of the scan Q node SC_Q. Thus, the scan carry signal SC_CRK may be maintained at the first low voltage VSS1, and the sensing signal SSK may be maintained at the second low voltage VSS2. Meanwhile, even if the sensing Q node SS_Q has the boosted high voltage BVDD, the first transistor T1 may be turned off in response to the first low voltage VSS1 of the scan Q node SC_Q, and the voltage of the sensing Q node SS_Q may be prevented from being transferred to the scan Q node SC_Q. Thus, even if the sensing Q node SS_Q has the boosted high voltage BVDD, by the first transistor T1, the voltage of the scan Q node SC_Q may be maintained at the first low voltage VSS1.

Further, in the second time period TP2, the fourth transistor T4 may be turned on in response to the boosted high voltage BVDD of the scan Q node SC_Q, and may transfer the first low voltage VSS1 to the shared QB node QB. Meanwhile, the sixth transistor T6 may be turned on in response to the high voltage VDD, but, since the seventh transistor T7 is turned on, the eighth transistor T8 may be turned off. In addition, in the second time period TP2, the fifth transistor T5, the tenth transistor T10, the twelfth transistor T12, the fourteenth transistor T14, the sixteenth transistor T16, the eighteenth transistor T18, the nineteenth transistor T19, the twentieth transistor T20 and the twenty-first transistor T21 may be turned off.

Thereafter, when the sensing clock signal SS_CK is changed to the second low voltage VSS2 and the carry clock signal CR_CK is changed to the first low voltage VSS1, the stage 200 may output the sensing signal SSK having the second low voltage VSS2, the sensing carry signal SS_CRK having the first low voltage VSS1, the scan signal SCK having the second low voltage VSS2, and the scan carry signal SC_CRK having the first low voltage VSS1.

As described above, in the self-scan period SSCANP, the stage 200 may output the sensing signal SSK having the high voltage VDD, but may maintain the scan signal SCK at the second low voltage VSS2.

Figure 9:
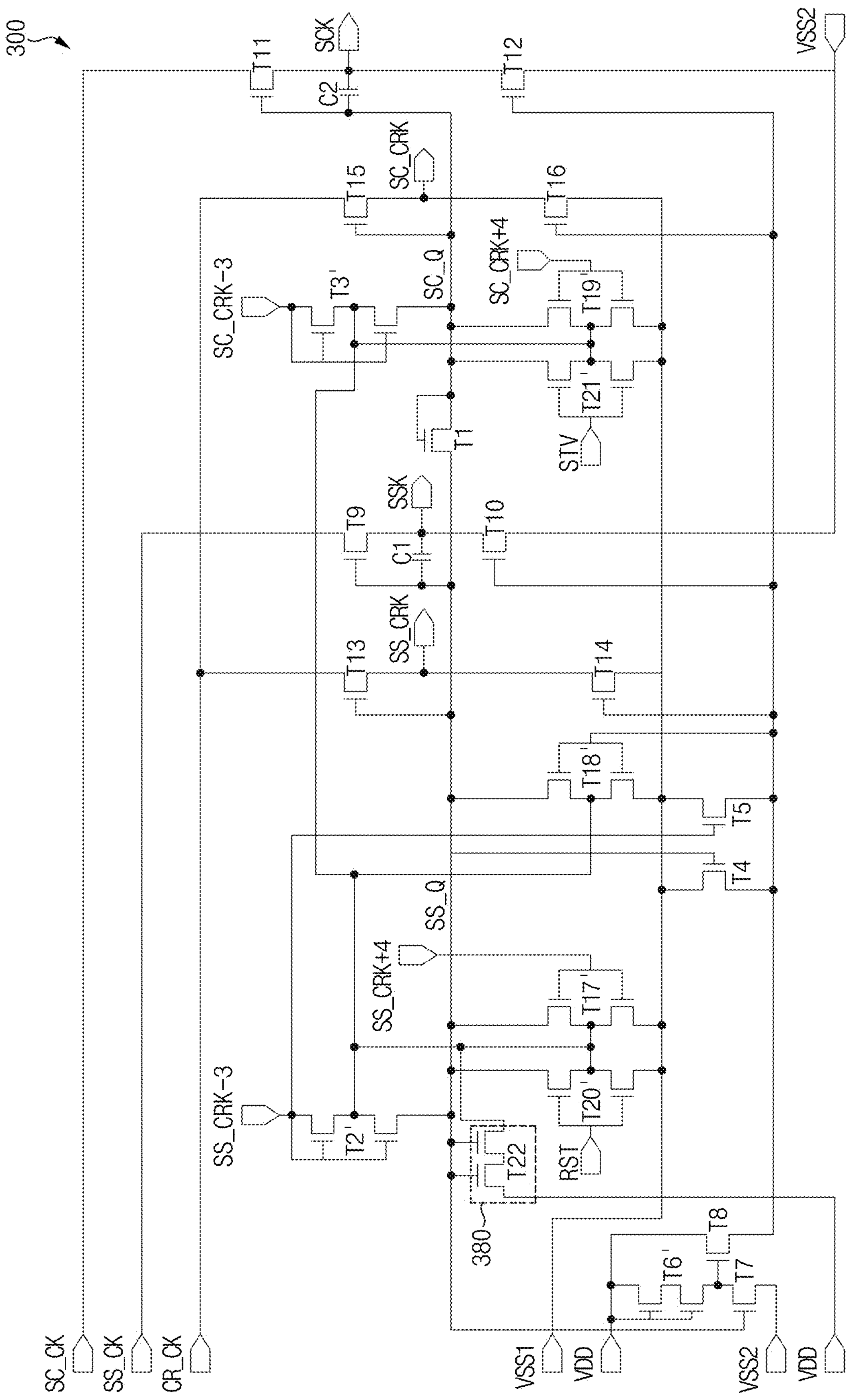
FIG. 9 is a circuit diagram illustrating a stage of a gate driver according to some embodiments.

FIG. 9 is a circuit diagram illustrating a stage of a gate driver according to some embodiments. Although FIG. 9 illustrates various components in a stage of a gate driver according to some embodiments, embodiments according to the present disclosure are not limited thereto, and according to various embodiments, the stage may include additional components or fewer components without departing from the spirit and scope of embodiments according to the present disclosure.

Referring to FIG. 9, a stage 300 of a gate driver according to some embodiments may include a first transistor T1, a second transistor T2', a third transistor T3', a fourth transistor T4, a fifth transistor T5, a sixth transistor T6', a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17', an eighteenth transistor T18', a nineteenth transistor T19', a twentieth transistor T20', a twenty-first transistor T21', a first capacitor C1, a second capacitor C2 and an intermediate node controlling circuit 380. The stage 300 of FIG. 9 may have substantially the same configuration and operation as a stage 200 of FIG. 4, except that each of the second, third, sixth, seventeenth, eighteenth, nineteenth, twentieth and twenty-first transistors T2', T3', T6', T17', T18', T19', T20' and T21' may include a plurality of sub-transistors, and the stage 300 may further include the intermediate node controlling circuit 380.

According to some embodiments, each of the second, third, sixth, seventeenth, eighteenth, nineteenth, twentieth and twenty-first transistors T2', T3', T6', T17', T18', T19', T20' and T21' may be implemented as a dual transistor including two sub-transistors connected in series. In this case, leakage currents through the second, third, sixth, seventeenth, eighteenth, nineteenth, twentieth and twenty-first transistors T2', T3', T6', T17', T18', T19', T20' and T21' may be reduced.

The intermediate node controlling circuit 380 may transfer a high voltage VDD to a node between the two sub-transistors of at least one of the second, third, sixth, seventeenth, eighteenth, nineteenth, twentieth, or twenty-first transistors T2', T3', T6', T17', T18', T19', T20', or T21' when a sensing Q node SS_Q has a boosted high voltage. For example, when the sensing Q node SS_Q has the boosted high voltage, the intermediate node controlling circuit 380 may transfer the high voltage VDD to the node between the two sub-transistors of each of the second, seventeenth, eighteenth and twentieth transistors T2', T17', T18' and T20' directly connected to the sensing Q node SS_Q, and may also transfer the high voltage VDD to the third, nineteenth and twentieth transistors T3', T19' and T21' directly connected to a scan Q node SC_Q. Accordingly, even if the sensing Q node SS_Q and/or the scan Q node SC_Q has the boosted high voltage, since the high voltage VDD is applied to the node between the two sub-transistors, a high drain-source voltage stress may be distributed to the two sub-transistors.

According to some embodiments, the intermediate node controlling circuit 380 may include a twenty-second transistor T22 including a gate connected to the sensing Q node SS_Q, a first terminal which receives the high voltage VDD, and a second terminal connected to the node between two sub-transistors. Further, in some embodiments, as illustrated in FIG. 9, the twenty-second transistor T22 may be implemented as a dual transistor including two sub-transistors connected in series.

Figure 10:
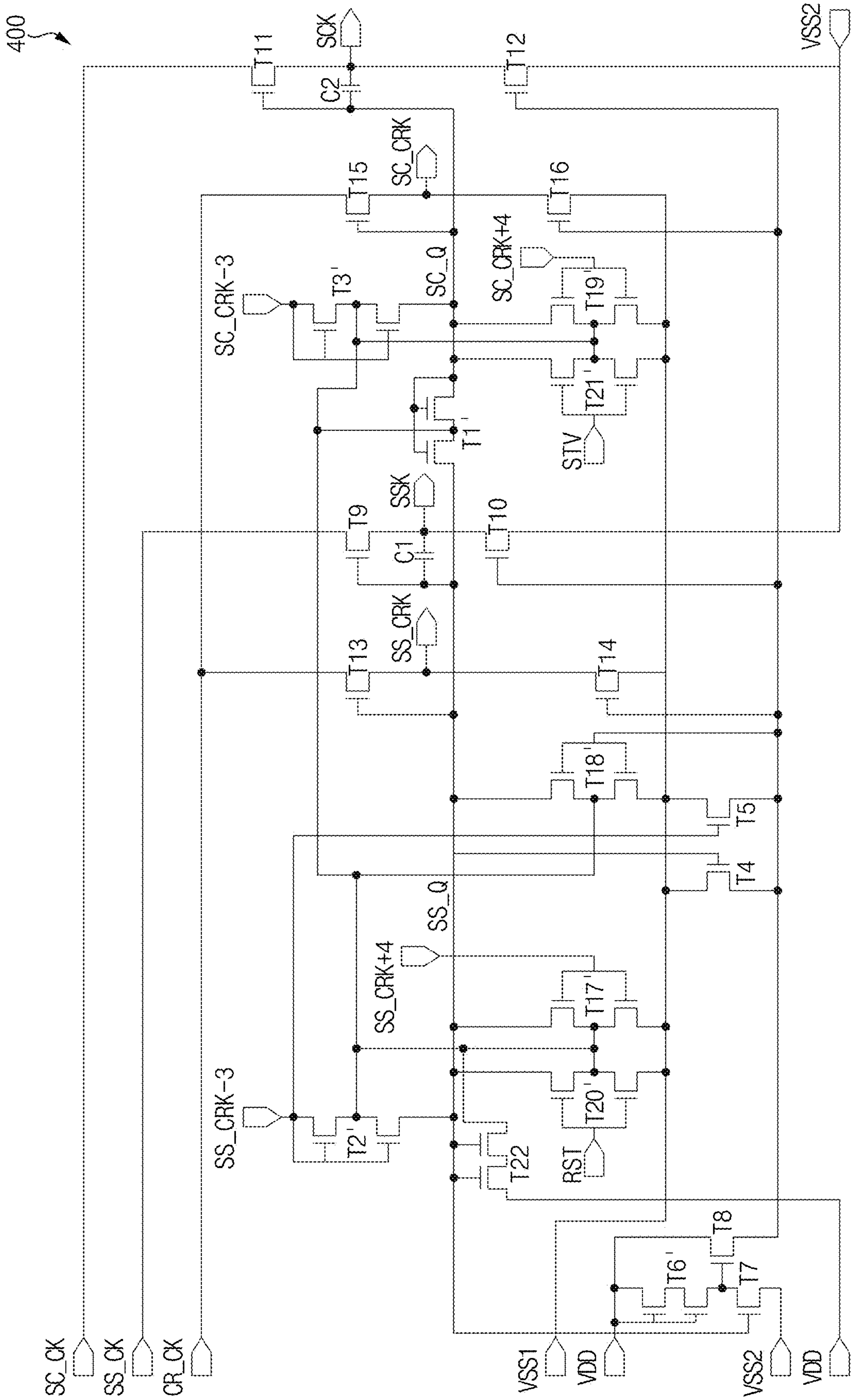
FIG. 10 is a circuit diagram illustrating a stage of a gate driver according to some embodiments.

FIG. 10 is a circuit diagram illustrating a stage of a gate driver according to some embodiments. Although FIG. 10 illustrates various components in a stage of a gate driver according to some embodiments, embodiments according to the present disclosure are not limited thereto, and according to various embodiments, the stage may include additional components or fewer components without departing from the spirit and scope of embodiments according to the present disclosure.

Referring to FIG. 10, a stage 400 of a gate driver according to some embodiments may include a first transistor T1', a second transistor T2', a third transistor T3', a fourth transistor T4, a fifth transistor T5, a sixth transistor T6', a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17', an eighteenth transistor T18', a nineteenth transistor T19', a twentieth transistor T20', a twenty-first transistor T21', a twenty-second transistor T22, a first capacitor C1 and a second capacitor C2. The stage 400 of FIG. 10 may have substantially the same configuration and operation as a stage 300 of FIG. 9, except that the first transistor T1' includes a plurality of sub-transistors.

According to some embodiments, the first transistor T1' may be implemented as a dual transistor including two sub-transistors connected in series. In a case where scan Q nodes SC_Q of a plurality of stages of the gate driver are reset in response to a start signal STV in a hold period HP illustrated in FIG. 3, within an overlapping period OP illustrated in FIG. 3, the sensing Q node SS_Q of the stage 400 may have a boosted high voltage, and the scan Q node SC_Q of the stage 400 may have a first low voltage VSS1. Further, when the sensing Q node SS_Q has the boosted high voltage and the scan Q node SC_Q has the first low voltage VSS1, a high drain-source voltage stress may be applied to the first transistor T1'. However, in the stage 400 of the gate driver according to some embodiments, the first transistor T1' may include the two sub-transistors connected in series, a high voltage VDD may be transferred to a node between the two sub-transistors when the sensing Q node SS_Q has the boosted high voltage, and thus the high drain-source voltage stress may be distributed to the two sub-transistors.

Figure 11:
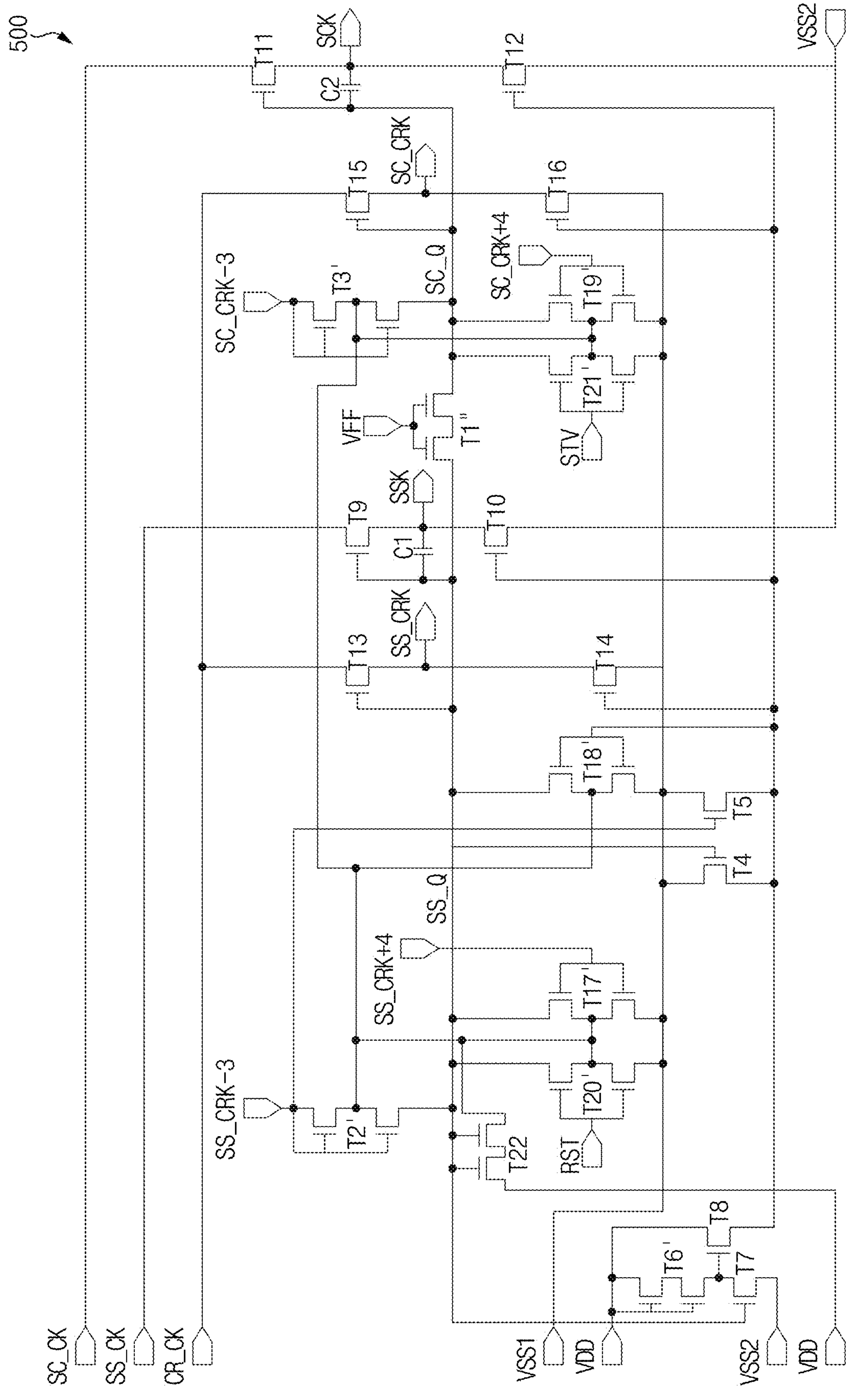
FIG. 11 is a circuit diagram illustrating a stage of a gate driver according to some embodiments.

FIG. 11 is a circuit diagram illustrating a stage of a gate driver according to some embodiments. Although FIG. 11 illustrates various components in a stage of a gate driver according to some embodiments, embodiments according to the present disclosure are not limited thereto, and according to various embodiments, the stage may include additional components or fewer components without departing from the spirit and scope of embodiments according to the present disclosure.

Referring to FIG. 11, a stage 500 of a gate driver according to some embodiments may include a first transistor T1", a second transistor T2', a third transistor T3', a fourth transistor T4, a fifth transistor T5, a sixth transistor T6', a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17', an eighteenth transistor T18', a nineteenth transistor T19', a twentieth transistor T20', a twenty-first transistor T21', a twenty-second transistor T22, a first capacitor C1 and a second capacitor C2. The stage 500 of FIG. 11 may have substantially the same configuration and operation as a stage 300 of FIG. 9 or a stage 400 of FIG. 10, except that the first transistor T1" may be turned on or off in response to a control signal VFF.

The first transistor T1" may selectively connect a sensing Q node SS_Q and a scan Q node SC_Q to each other in response to the control signal VFF. Further, the control signal VFF may have an on-level (e.g., a high level) in an active scan period, and may have an off-level (e.g., a low level) in a self-scan period. Thus, the first transistor T1" may connect the sensing Q node SS_Q and the scan Q node SC_Q to each other in response to the control signal VFF having the on-level in the active scan period, and may separate (or disconnect) the sensing Q node SS_Q and the scan Q node SC_Q from each other in response to the control signal VFF having the off-level in the self-scan period. According to some embodiments, the first transistor T1" may include a gate which receives the control signal VFF, a first terminal connected to the sensing Q node SS_Q, and a second terminal connected to the scan Q node SC_Q.

Figure 12:
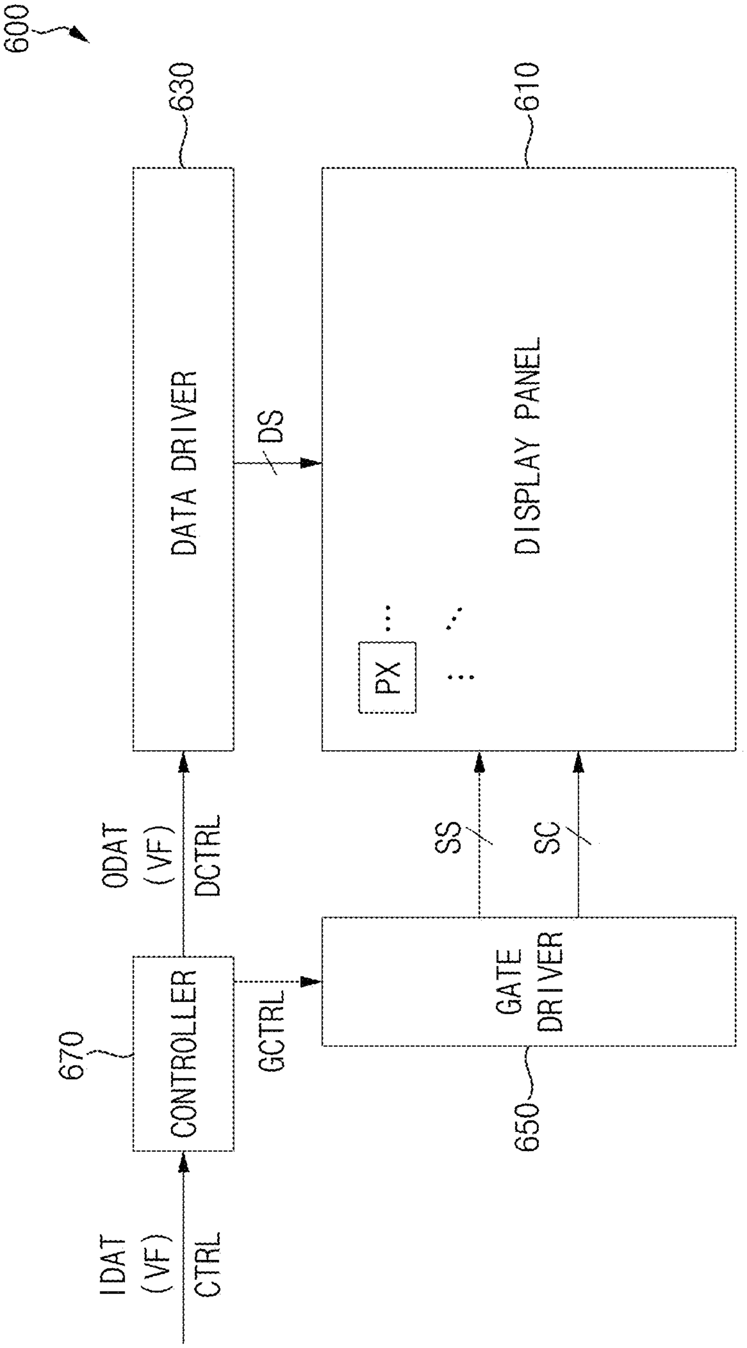
FIG. 12 is a block diagram illustrating a display device according to some embodiments.
Figure 13:
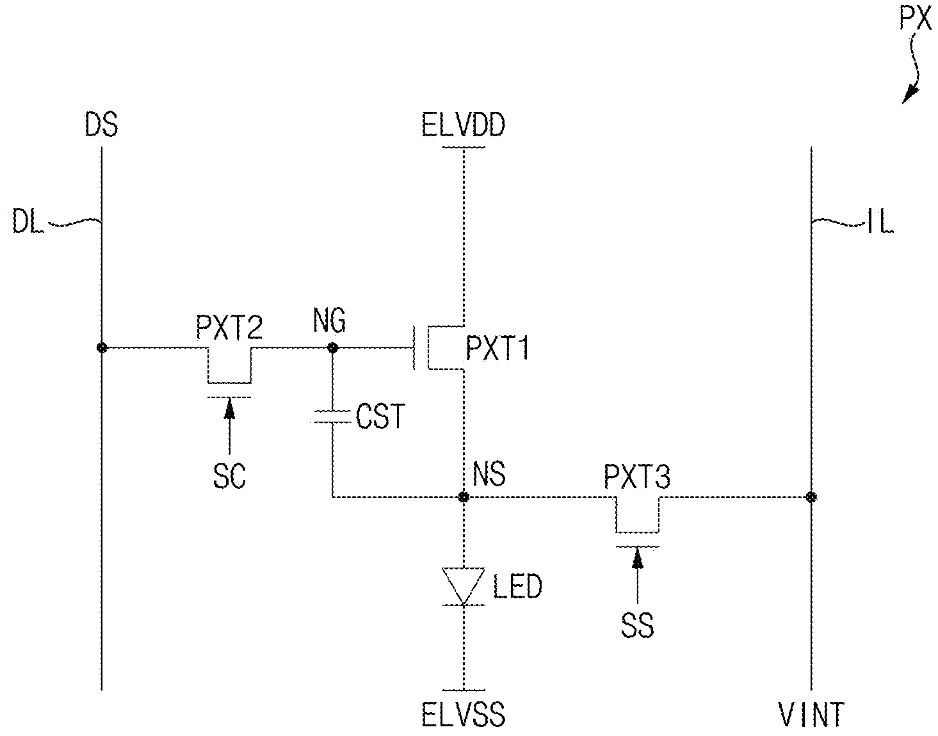
FIG. 13 is a circuit diagram illustrating an example of a pixel included in a display device according to some embodiments.

FIG. 12 is a block diagram illustrating a display device according to some embodiments, and FIG. 13 is a circuit diagram illustrating an example of a pixel included in a display device according to some embodiments. Although FIG. 13 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 14:
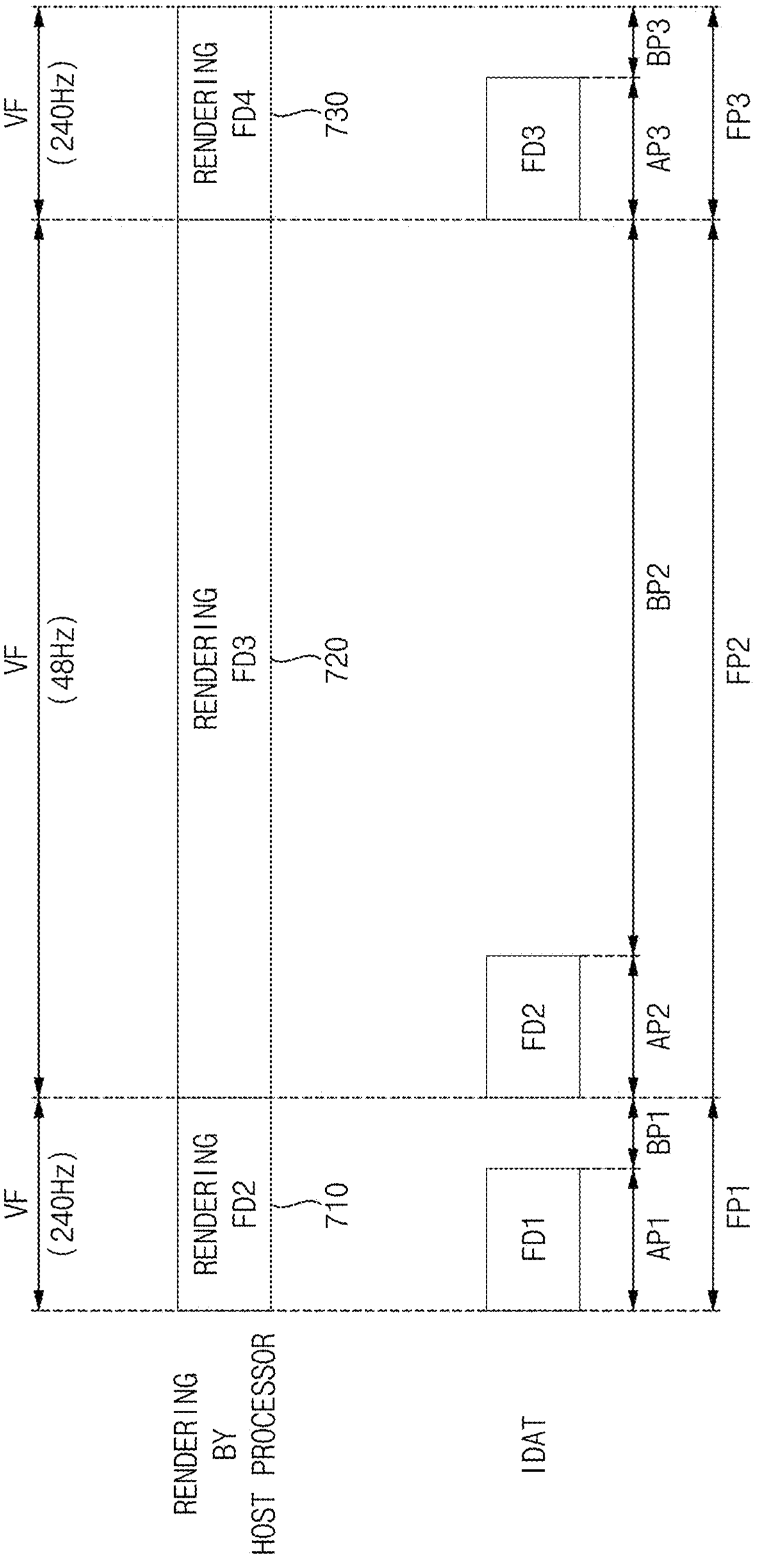
FIG. 14 is a timing diagram illustrating an example of input image data that are input to a display device at a variable frequency.
Figure 15:
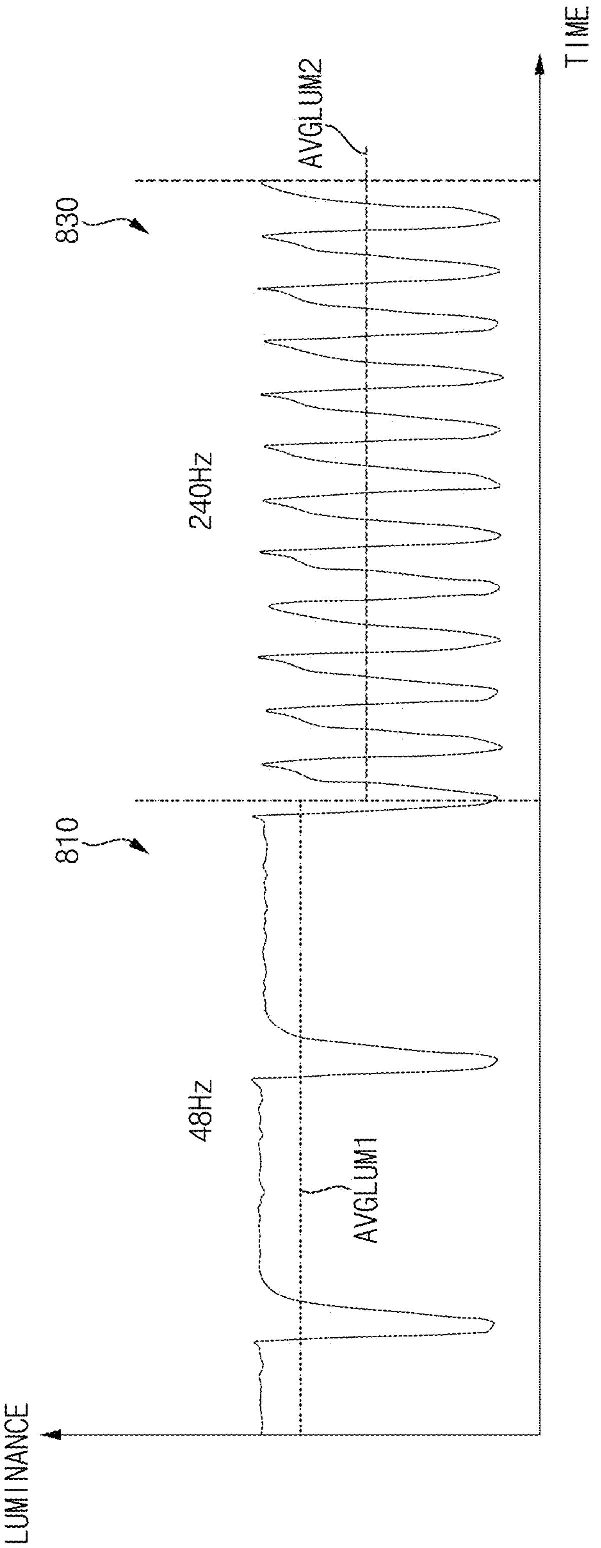
FIG. 15 is a diagram illustrating an example of luminances of a display panel driven at different driving frequencies in an alternative display device.
Figure 16:
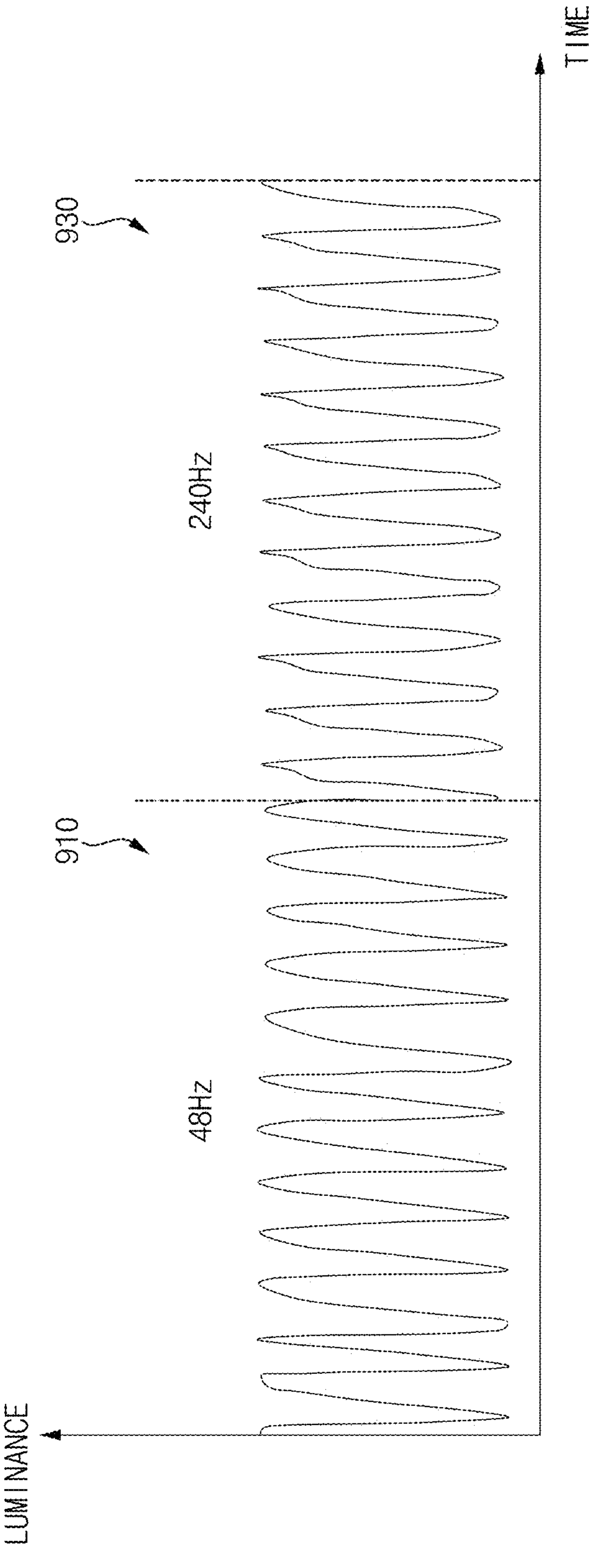
FIG. 16 is a diagram illustrating an example of luminances of a display panel driven at different driving frequencies in a display device according to some embodiments.

FIG. 14 is a timing diagram illustrating an example of input image data that are input to a display device at a variable frequency, FIG. 15 is a diagram illustrating an example of luminances of a display panel driven at different driving frequencies in an alternative display device, and FIG. 16 is a diagram illustrating an example of luminances of a display panel driven at different driving frequencies in a display device according to some embodiments.

Referring to FIG. 12, a display device 600 according to some embodiments may include a display panel 610 that includes a plurality of pixels PX, a data driver 630 that provides data signals DS to the plurality of pixels PX, a gate driver 650 that sequentially provides a scan signal SC and a sensing signal SS to the plurality of pixels PX on a row-by-row basis, and a controller 670 that controls an operation of the display device 600.

The display panel 610 may include a plurality of data lines, a plurality of scan signal lines, a plurality of sensing signal lines, a plurality of initialization lines, and the plurality of pixels PX connected thereto. According to some embodiments, each pixel PX may include a light emitting element, and the display panel 610 may be a light emitting display panel. For example, as illustrated in FIG. 13, each pixel PX may have a 3T1C structure including a first transistor PXT1, a second transistor PXT2, a third transistor PXT3, a capacitor CST and a light emitting element LED.

The capacitor CST may store the data signal DS transferred by the second transistor PXT2 from the data line DL. The capacitor CST may be referred to as a storage capacitor for storing the data signal DS. According to some embodiments, the capacitor CST may include a first electrode connected to a first node NG (e.g., a gate node) and a second electrode connected to a second node NS (e.g., a source node).

The first transistor PXT1 may generate a driving current based on a data signal DS stored in the capacitor CST. The first transistor PXT1 may be referred to as a driving transistor for generating the driving current. According to some embodiments, the first transistor PXT1 may include a gate connected to the first node NG, a first terminal (e.g., a drain) which receives a first power supply voltage ELVDD, and a second terminal (e.g., a source) connected to the second node NS.

The second transistor PXT2 may transfer the data signal DS of the data line DL to the first node NG in response to the scan signal SC. The second transistor T2 may be referred to as a scan transistor. According to some embodiments, the second transistor PXT2 may include a gate which receives the scan signal SC, a first terminal connected to the data line DL, and a second terminal connected to the first node NG.

The third transistor PXT3 may connect the initialization line IL to the second node NS in response to the sensing signal SS. Thus, the third transistor PXT3 may transfer an initialization voltage VINT of the initialization line IL to the second node NS in response to the sensing signal SS. According to some embodiments, the display device 600 may further include a sensing circuit, and the sensing circuit may sense a characteristic of the pixel PX through the third transistor PXT3 and the initialization line IL in a sensing period. That is, in this case, the initialization line IL may be used as a sensing line. According to some embodiments, the third transistor PXT3 may include a gate which receives the sensing signal SS, a first terminal connected to the second node NS, and a second terminal connected to the initialization line IL.

The light emitting element LED may emit light in response to the driving current flowing from a line which transfers the first power supply voltage ELVDD to a line which transfers a second power supply voltage ELVSS. According to some embodiments, the light emitting element LED may include an anode connected to the second node NS, and a cathode which receives the second power supply voltage ELVSS. According to some embodiments, the light emitting element LED may be an organic light emitting diode ("OLED"). In other embodiments, the light emitting element LED may be a nano light emitting diode ("NED"), a quantum dot ("QD") light emitting diode, a micro-light emitting diode, an inorganic light emitting diode, or any other suitable light emitting element.

According to some embodiments, as illustrated in FIG. 13, the first, second and third transistors PXT1, PXT2 and PXT3 may be implemented as, but not limited to, N-type metal-oxide-semiconductor ("NMOS") transistors. Further, although FIG. 13 illustrates an example of the pixel PX having the 3T1C structure, the structure of the pixel PX according to some embodiments is not limited to the example of FIG. 13. For example, the pixel PX may have a different number of transistors and/or a different number of capacitors in other embodiments. In other embodiments, the display panel 610 may be a liquid crystal display (LCD) panel, or any other suitable display panel.

The data driver 630 may generate the data signals DS based on output image data ODAT and a data control signal DCTRL received from the controller 670, and may provide the data signals DS to the plurality of pixels PX through the plurality of data lines. According to some embodiments, the data control signal DCTRL may include, but is not limited to, an output data enable signal, a horizontal start signal and a load signal. Further, in some embodiments, the data driver 620 may receive the output image data ODAT at a variable frequency VF that is varied or changed within a variable frequency range (e.g., from about 48 Hz to about 240 Hz) from the controller 670. According to some embodiments, the data driver 630 and the controller 670 may be implemented as a single integrated circuit, and the single integrated circuit may be referred to as a timing controller embedded data driver (TED) integrated circuit. In other embodiments, the data driver 630 and the controller 670 may be implemented as separate integrated circuits.

The gate driver 650 may generate the sensing signal SS and/or the scan signal SC based on a gate control signal GCTRL received from the controller 670, and may sequentially provide the sensing signal SS and/or the scan signal SC to the plurality of pixels PX on a row-by-row basis through the plurality of scan signal lines and/or the plurality of sensing signal lines. According to some embodiments, the gate control signal GCTRL may include, but is not limited to, a start signal STV, a sensing clock signal SS_CK, a scan clock signal SC_CK, a carry clock signal CR_CK, etc. illustrated in FIG. 1. Further, according to some embodiments, the gate driver 650 may be a gate driver 100 of FIG. 1 including a stage 200 of FIG. 4, a stage 300 of FIG. 9, a stage 400 of FIG. 10 or a stage 500 of FIG. 10. According to some embodiments, the gate driver 650 may be integrated or formed in the display panel 610. In other embodiments, the gate driver 650 may be implemented with one or more integrated circuits.

The controller 670 (e.g., a timing controller) may receive input image data IDAT and a control signal CTRL from an external host processor (e.g., a graphics processing unit ("GPU"), an application processor ("AP") or a graphics card). According to some embodiments, the input image data IDAT may be RGB image data including red image data, green image data, and blue image data. Further, in some embodiments, the control signal CTRL may include, but is not limited to, a vertical synchronization signal, a horizontal synchronization signal, an input data enable signal, a master clock signal, etc. The controller 670 may generate the output image data ODAT, the data control signal DCTRL and the gate control signal GCTRL based on the input image data IDAT and the control signal CTRL. The controller 670 may control an operation of the data driver 630 by providing the output image data ODAT and the data control signal DCTRL to the data driver 630, and may control an operation of the gate driver 650 by providing the gate control signal GCTRL to the gate driver 650.

The host processor may provide the input image data IDAT to the display device 600 at a variable frequency VF (or a variable refresh rate) by changing a time length of a blank period in each frame period. The controller 670 may receive the input image data IDAT from the host processor at the variable frequency VF that is varied or changed within a variable frequency range. For example, a maximum frequency of the variable frequency range may be, but is not limited to, about 240 Hz, a minimum frequency of the variable frequency range may be, but is not limited to, about 48 Hz, and the variable frequency range may be, but is not limited to, from about 48 Hz to about 240 Hz. Further, the controller 670 may control the data driver 630 and the gate driver 650 to drive the display panel 610 at the variable frequency VF. According to some embodiments, a mode of the display device 600 in which the display panel 610 is driven at the variable frequency VF (or the variable refresh rate) may be referred to as a variable frame mode. For example, the variable frame mode may be, but is not be limited to, a Free-Sync mode, a G-Sync mode, etc.

For example, as illustrated in FIG. 14, a period or a frequency of renderings 710, 720 and 730 by the host processor (e.g., the GPU, the AP or the graphics card) may not be constant. The host processor may provide the input image data IDAT (or frame data FD1, FD2 and FD3) to the display device 600 in synchronization with these irregular periods or frequencies of the renderings 710, 720 and 730 in the variable frame mode. According to some embodiments of the variable frame mode, each frame period FP1, FP2 and FP3 may include a constant active period AP1, AP2 and AP3 having a constant time length, and the host processor may provide the frame data FD1, FD2 and FD3 to the display device 600 at the variable frequency VF by changing a time length of a blank period BP1, BP2 and BP3 of each frame period FP1, FP2 and FP3. The gate driver 650 may perform an active scan operation that sequentially provides the sensing signal SS and the scan signal SC to the plurality of pixels PX on the row-by-row basis in each active period AP1, AP2 and AP3 (or each active scan period). Further, each blank period (e.g., BP1) may be a period between adjacent active periods (e.g., AP1 and AP2), in which no data signal DS is written to the plurality of pixels PX of the display panel 610.

In the example of FIG. 14, if a rendering 710 for second frame data FD2 is performed at a frequency of about 240 Hz in a first frame period FP1, the host processor may provide first frame data FD1 to the display device 600 at the variable frequency VF of about 240 Hz in the first frame period FP1. Further, the host processor may output the second frame data FD2 during an active period AP2 of a second frame period FP2, and may extend the duration of a blank period BP2 of the second frame period FP2 until a rendering 720 for third frame data FD3 is completed. Thus, in the second frame period FP2, if the rendering 720 for the third frame data FD3 is performed at a frequency of about 48 Hz, the host processor may provide the second frame data FD2 to the display device 600 at the variable frequency VF of about 48 Hz by increasing a time length of the blank period BP2 of the second frame period FP2. As a result, the blank period BP2 of the second frame period may be longer than the blank period BP1 of the first frame period. In a third frame period FP3, if a rendering 730 for fourth frame data FD4 is performed again at a frequency of about 240 Hz, the host processor may provide the third frame data FD3 to the display device 600 again at the variable frequency VF of about 240 Hz.

An alternative display device that operates in the variable frame mode may have different luminance at different frequencies. For example, in an alternative display device, each pixel may receive a sensing signal only once in each frame period FP1, FP2 and FP3, a second node of each pixel may be initialized only once based on an initialization voltage in each frame period FP1, FP2 and FP3, and an light emitting element of each pixel may be turned off only once in each frame period FP1, FP2 and FP3. Further, in a case where the time length of each frame period FP1, FP2 and FP3 is changed, the number of times the scan signal is applied to each pixel for a certain period of time, or the number of times the light emitting element of each pixel is turned off for the certain period of time, may be changed. For example, as illustrated in FIG. 15, an alternative display device may have a luminance 810 when the display panel is driven at a lower frequency of about 48 Hz, and a luminance 830 when the display panel is driven at a higher frequency of about 240 Hz. As illustrated in FIG. 15, during the same time period, each light emitting element of the display panel driven at the frequency of about 48 Hz may be off about 2 times, but each light emitting element of the display panel driven at the frequency of about 240 Hz may be off about 12 times. Accordingly, an average luminance AVGLUM2 of the display panel driven at the frequency of about 240 Hz may be different from (e.g., lower than) an average luminance AVGLUM1 of the display panel driven at the frequency of about 48 Hz.

However, in the display device 600 according to some embodiments, the gate driver 650 may perform the active scan operation that sequentially provides the scan signal SC and the sensing signal SS to the plurality of pixels PX on the row-by-row basis in the active period (or the active scan period) of each frame period, and may also perform a self-scan operation that sequentially provides the sensing signal SS to the plurality of pixels PX on the row-by-row basis in a self-scan period within a blank period of each frame period in a case where the blank period of each frame period is longer than a reference blank time. According to some embodiments, the reference blank time may correspond to a time length of a blank period of the minimum frame period (e.g. of about 4.2 ms) corresponding to the maximum frequency (e.g., of about 240 Hz) of the variable frequency range. Further, in some embodiments, the gate driver 650 may repeatedly perform the self-scan operation until the blank period ends.

In the display device 600 according to some embodiments, since the gate driver 650 performs the self-scan operation, the display panel 610 may have substantially the same luminance at different frequencies. For example, as illustrated in FIG. 16, in the display device 600 according to some embodiments, each light emitting element LED of the display panel 610 driven at a frequency of about 48 Hz and each light emitting element LED of the display panel 610 driven at a frequency of about 240 Hz may be off the same number of times during the same time. Accordingly, in the display device 600 according to some embodiments, the brightness 930 of the display panel 610 driven at the frequency of about 240 Hz may be substantially the same as the luminance 910 of the display panel 610 driven at the frequency of about 48 Hz.

Figure 17:
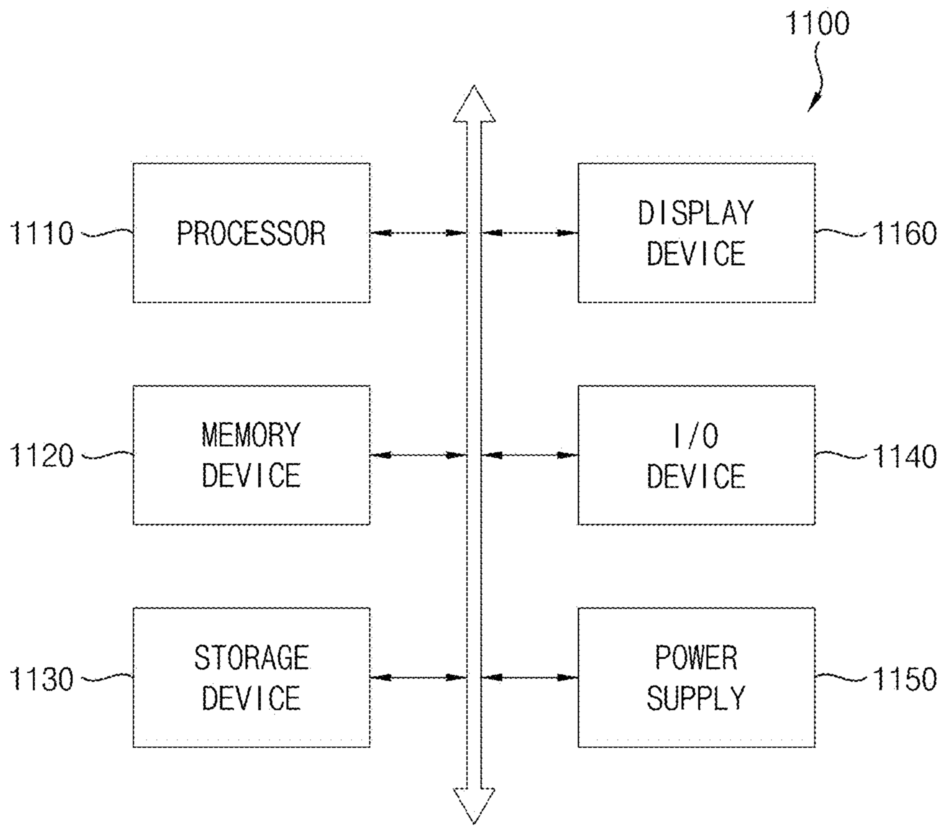
FIG. 17 is a block diagram illustrating an electronic device including a display device according to some embodiments.

FIG. 17 is a block diagram illustrating an electronic device including a display device according to some embodiments.

Referring to FIG. 17, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, a single stage of a gate driver may output two gate signals, or a sensing signal and a scan signal. Further, the stage may output the sensing signal and the scan signal by using a single shared QB node and a single QB node controlling circuit. Accordingly, the gate driver may have a small size, and a dead space area of the display device 1160 may be reduced.

Embodiments according to the present disclosure may be applied to any display device 1160, and any electronic device 1100 including the display device 1160. For example, embodiments according to the present disclosure may be applied to a smart phone, a wearable electronic device, a mobile phone, a television ("TV") (e.g., a digital TV, a three-dimensional ("3D") TV, etc.), a personal computer ("PC") (e.g., a tablet computer, a laptop computer, etc.), a home appliance, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A gate driver including a plurality of stages, at least one stage of the plurality of stages comprising:

a sensing input circuit configured to transfer a sensing input signal to a sensing Q node;

a scan input circuit configured to transfer a scan input signal to a scan Q node;

a Q node separating circuit between the sensing Q node and the scan Q node, and configured to prevent a voltage of the sensing Q node from being transferred to the scan Q node;

a QB node controlling circuit configured to control a voltage of a shared QB node based on a high voltage, a first low voltage and the voltage of the sensing Q node;

a sensing carry circuit configured to output a carry clock signal as a sensing carry signal in response to the voltage of the sensing Q node, and to output the first low voltage as the sensing carry signal in response to the voltage of the shared QB node;

a sensing output circuit configured to output a sensing clock signal as a sensing signal in response to the voltage of the sensing Q node, and to output a second low voltage as the sensing signal in response to the voltage of the shared QB node;

a scan carry circuit configured to output the carry clock signal as a scan carry signal in response to a voltage of the scan Q node, and to output the first low voltage as the scan carry signal in response to the voltage of the shared QB node; and a scan output circuit configured to output a scan clock signal as a scan signal in response to the voltage of the scan Q node, and to output the second low voltage as the scan signal in response to the voltage of the shared QB node.

2. The gate driver of claim 1, wherein an active scan period is initiated in an active period of a frame period, wherein, in the active scan period, the plurality of stages are configured to sequentially output the sensing signal having the high voltage and the scan signal having the high voltage, wherein, based on a blank period of the frame period continuing for a predetermined time, a self-scan period is initiated in the blank period, and wherein, in the self-scan period, the plurality of stages are configured to sequentially output the sensing signal having the high voltage, and to not output the scan signal having the high voltage.

3. The gate driver of claim 2, wherein, based on a next frame period starting before the self-scan period ends, the self-scan period overlaps with an active scan period of the next frame period, and wherein, in an overlapping period where the self-scan period and the active scan period of the next frame period overlap, a first portion of the plurality of stages sequentially outputs the sensing signal having the high voltage and the scan signal having the high voltage, and a second portion of the plurality of stages sequentially outputs the sensing signal having the high voltage and does not output the scan signal having the high voltage.

4. The gate driver of claim 3, wherein, based on the next frame period starting, the scan Q node of the at least one stage is reset to the first low voltage in response to a start signal, and the sensing Q node of the at least one stage is not reset.

5. The gate driver of claim 1, wherein the Q node separating circuit includes:

a first transistor which is diode-connected to prevent the voltage of the sensing Q node from being transferred to the scan Q node based on the sensing Q node having the high voltage.

6. The gate driver of claim 5, wherein the first transistor includes a gate connected to the scan Q node, a first terminal connected to the sensing Q node, and a second terminal connected to the scan Q node.

7. The gate driver of claim 1, wherein the Q node separating circuit includes:

a first transistor configured to selectively connect the sensing Q node and the scan Q node to each other in response to a control signal, and wherein the control signal has an on-level in an active scan period, and has an off-level in a self-scan period.

8. The gate driver of claim 7, wherein the first transistor includes a gate which receives the control signal, a first terminal connected to the sensing Q node, and a second terminal connected to the scan Q node.

9. The gate driver of claim 1, wherein the sensing input circuit includes:

a second transistor including a gate configured to receive the sensing input signal, a first terminal configured to receive the sensing input signal, and a second terminal connected to the sensing Q node, and wherein the scan input circuit includes:

a third transistor including a gate configured to receive the scan input signal, a first terminal configured to receive the scan input signal, and a second terminal connected to the scan Q node.

10. The gate driver of claim 1, wherein the QB node controlling circuit is configured to transfer the first low voltage to the shared QB node based on the sensing Q node having the high voltage or the sensing input signal having the high voltage, and to transfer the high voltage to the shared QB node based on the sensing Q node having the first low voltage.

11. The gate driver of claim 1, wherein the QB node controlling circuit includes:

a fourth transistor including a gate connected to the sensing Q node, a first terminal configured to receive the first low voltage, and a second terminal connected to the shared QB node;

a fifth transistor including a gate configured to receive the sensing input signal, a first terminal configured to receive the first low voltage, and a second terminal connected to the shared QB node;

a sixth transistor including a gate configured to receive the high voltage, a first terminal configured to receive the high voltage, and a second terminal;

a seventh transistor including a gate connected to the sensing Q node, a first terminal, and a second terminal configured to receive the second low voltage; and an eighth transistor including a gate connected to the second terminal of the sixth transistor and the first terminal of the seventh transistor, a first terminal configured to receive the high voltage, and a second terminal connected to the shared QB node.

12. The gate driver of claim 1, wherein the sensing output circuit includes:

a ninth transistor including a gate connected to the sensing Q node, a first terminal configured to receive the sensing clock signal, and a second terminal connected to a sensing output node from which the sensing signal is output;

a first capacitor including a first electrode connected to the sensing Q node, and a second electrode connected to the sensing output node; and a tenth transistor including a gate connected to the shared QB node, a first terminal connected to the sensing output node, and a second terminal configured to receive the second low voltage, and wherein the scan output circuit includes:

an eleventh transistor including a gate connected to the scan Q node, a first terminal configured to receive the scan clock signal, and a second terminal connected to an scan output node from which the scan signal is output;

a second capacitor including a first electrode connected to the scan Q node, and a second electrode connected to the scan output node; and a twelfth transistor including a gate connected to the shared QB node, a first terminal connected to the scan output node, and a second terminal configured to receive the second low voltage.

13. The gate driver of claim 1, wherein the sensing carry circuit includes:

a thirteenth transistor including a gate connected to the sensing Q node, a first terminal configured to receive the carry clock signal, and a second terminal connected to a sensing carry node from which the sensing carry signal is output; and a fourteenth transistor including a gate connected to the shared QB node, a first terminal connected to the sensing carry node, and a second terminal configured to receive the first low voltage, and wherein the scan carry circuit includes:

a fifteenth transistor including a gate connected to the scan Q node, a first terminal configured to receive the carry clock signal, and a second terminal connected to a scan carry node from which the scan carry signal is output; and a sixteenth transistor including a gate connected to the shared QB node, a first terminal connected to the scan carry node, and a second terminal configured to receive the first low voltage.

14. The gate driver of claim 1, wherein the at least one stage further comprises:

a sensing Q node discharging circuit configured to discharge the sensing Q node to the first low voltage in response to a sensing carry signal of a next stage or the voltage of the shared QB node; and a scan Q node discharging circuit configured to discharge the scan Q node to the first low voltage in response to the scan carry signal of the next stage.

15. The gate driver of claim 14, wherein the sensing Q node discharging circuit includes:

a seventeenth transistor including a gate configured to receive the sensing carry signal of the next stage, a first terminal connected to the sensing Q node, and a second terminal configured to receive the first low voltage; and an eighteenth transistor including a gate connected to the shared QB node, a first terminal connected to the sensing Q node, and a second terminal configured to receive the first low voltage, and wherein the scan Q node discharging circuit includes:

a nineteenth transistor including a gate which receives the scan carry signal of the next stage, a first terminal connected to the scan Q node, and a second terminal configured to receive the first low voltage.

16. The gate driver of claim 1, wherein the at least one stage further comprises:

a sensing reset circuit configured to reset the sensing Q node to the first low voltage in response to a reset signal that has the high voltage based on a self-scan period starting; and a scan reset circuit configured to reset the scan Q node to the first low voltage in response to a start signal that has the high voltage based on an active scan period starting or based on the self-scan period starting.

17. The gate driver of claim 16, wherein the sensing reset circuit includes:

a twentieth transistor including a gate configured to receive the reset signal, a first terminal connected to the sensing Q node, and a second terminal configured to receive the first low voltage, and wherein the scan reset circuit includes:

a twenty-first transistor including a gate configured to receive the start signal, a first terminal connected to the scan Q node, and a second terminal that receives the first low voltage.

18. The gate driver of claim 1, wherein at least one transistor included in the at least one stage includes a plurality of sub-transistors connected in series, and wherein the at least one stage further comprises:

an intermediate node controlling circuit configured to transfer the high voltage to a node between the plurality of sub-transistors.

19. The gate driver of claim 18, wherein the intermediate node controlling circuit includes:

a twenty-second transistor including a gate connected to the sensing Q node, a first terminal configured to receive the high voltage, and a second terminal connected to the node between the plurality of sub-transistors.

20. A display device comprising:

a display panel including a plurality of pixels;

a data driver configured to provide data signals to the plurality of pixels;

a gate driver configured to sequentially provide a sensing signal and a scan signal to the plurality of pixels; and a controller configured to control the data driver and the gate driver, wherein the gate driver includes a plurality of stages, and at least one stage of the plurality of stages comprises:

a sensing input circuit configured to transfer a sensing input signal to a sensing Q node;

a scan input circuit configured to transfer a scan input signal to a scan Q node;

a Q node separating circuit between the sensing Q node and the scan Q node, and configured to prevent a voltage of the sensing Q node from being transferred to the scan Q node;

a QB node controlling circuit configured to control a voltage of a shared QB node based on a high voltage, a first low voltage and the voltage of the sensing Q node;

a sensing carry circuit configured to output a carry clock signal as a sensing carry signal in response to the voltage of the sensing Q node, and to output the first low voltage as the sensing carry signal in response to the voltage of the shared QB node;

a sensing output circuit configured to output a sensing clock signal as the sensing signal in response to the voltage of the sensing Q node, and to output a second low voltage as the sensing signal in response to the voltage of the shared QB node;

a scan carry circuit configured to output the carry clock signal as a scan carry signal in response to a voltage of the scan Q node, and to output the first low voltage as the scan carry signal in response to the voltage of the shared QB node; and a scan output circuit configured to output a scan clock signal as the scan signal in response to the voltage of the scan Q node, and to output the second low voltage as the scan signal in response to the voltage of the shared QB node.

* * * * *